United States Patent [19]

Husky

[11] 4,208,856

[45] Jun. 24, 1980

[54] FIELD TO COTTON GIN HANDLING AND STORAGE SYSTEMS

[75] Inventor: Glover A. Husky, Lubbock, Tex.

[73] Assignee: Allied Products Corp., Chicago, Ill.

[21] Appl. No.: 941,175

[22] Filed: Sep. 11, 1978

Related U.S. Application Data

[60] Division of Ser. No. 759,392, Jan. 14, 1974, Pat. No. 4,127,061, which is a division of Ser. No. 568,004, Apr. 14, 1975, Pat. No. 4,031,003, which is a continuation-in-part of Ser. No. 513,145, Oct. 8, 1974, abandoned, which is a continuation-in-part of Ser. No. 428,384, Dec. 26, 1973, Pat. No. 3,879,049.

[51] Int. Cl.² ............................................. B65B 1/24
[52] U.S. Cl. ....................................................... 53/438
[58] Field of Search ................................. 53/436, 438

[56] References Cited

U.S. PATENT DOCUMENTS

| 1,948,615 | 2/1934 | Clark | 53/436 |
| 3,380,221 | 4/1968 | Thiele | 53/436 X |

*Primary Examiner*—Travis S. McGehee
*Attorney, Agent, or Firm*—Ely Silverman

[57] ABSTRACT

An overall system of transporting and handling seed cotton comprising apparatus for and process steps of (a) compressing seed cotton after gathering thereof, (b) storage, (c) transport and (d) decompression and dispersion prior to ginning, is designed around (1) a transport pallet and (2) a pallet and module load discharge and manipulation apparatus adapted to manipulate the loaded pallet, separate the load and the pallet and treat the load.

3 Claims, 42 Drawing Figures

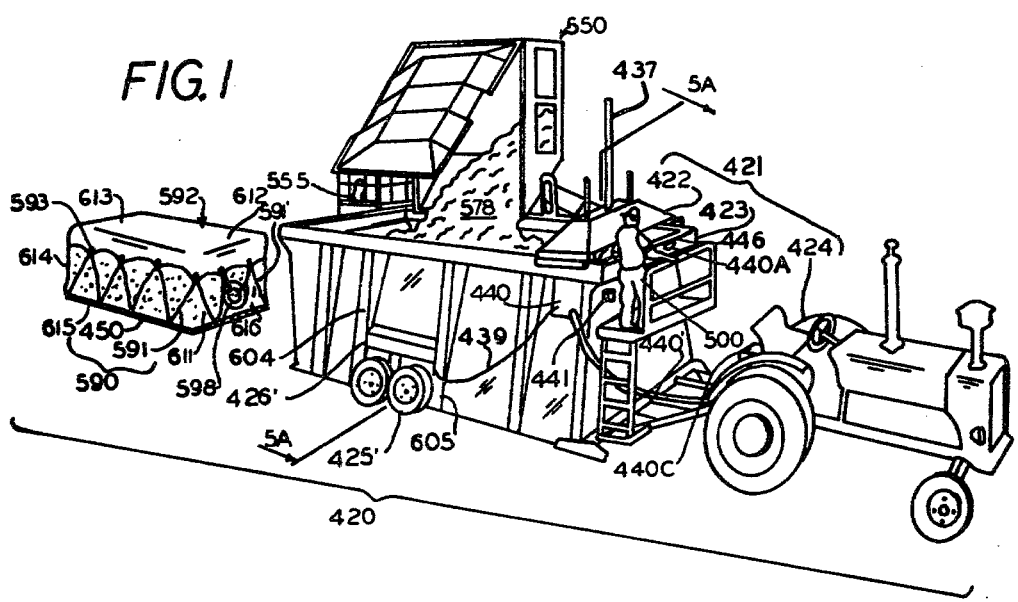
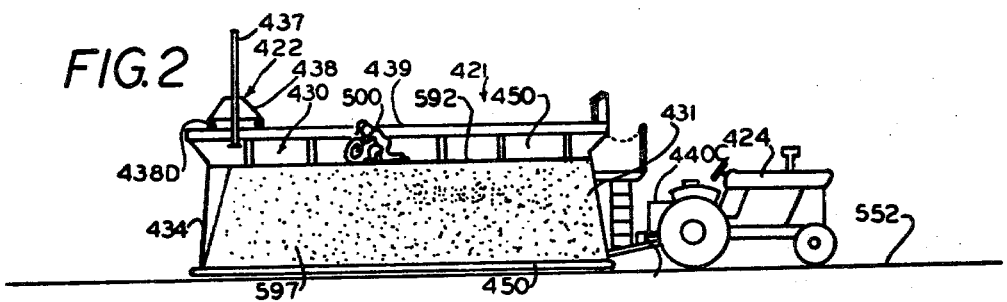
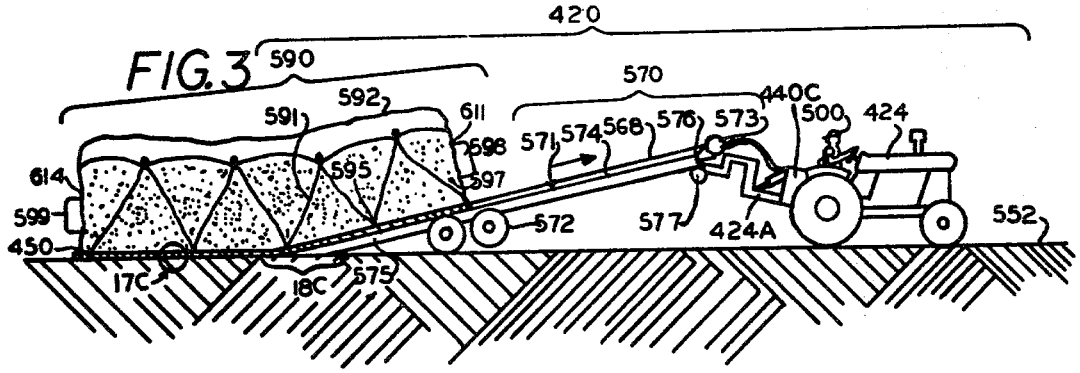

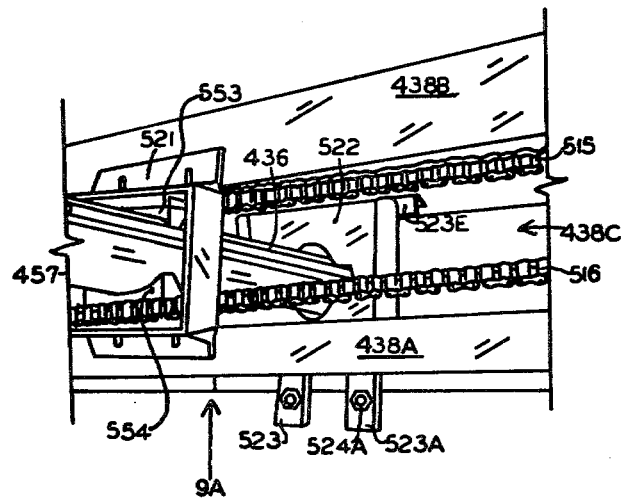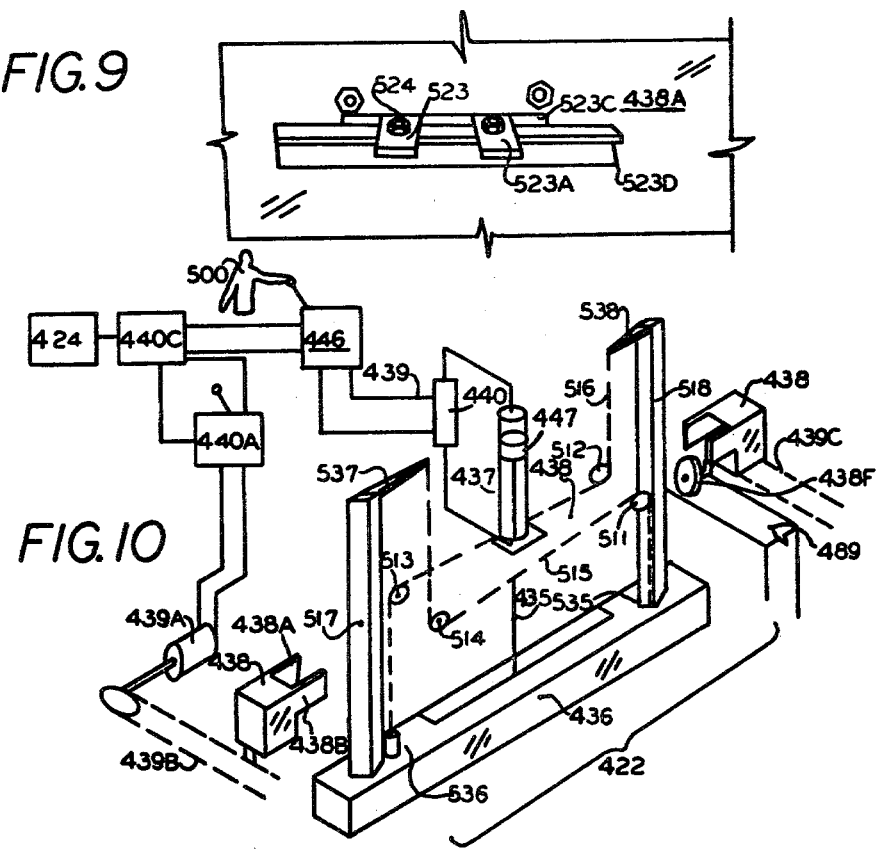

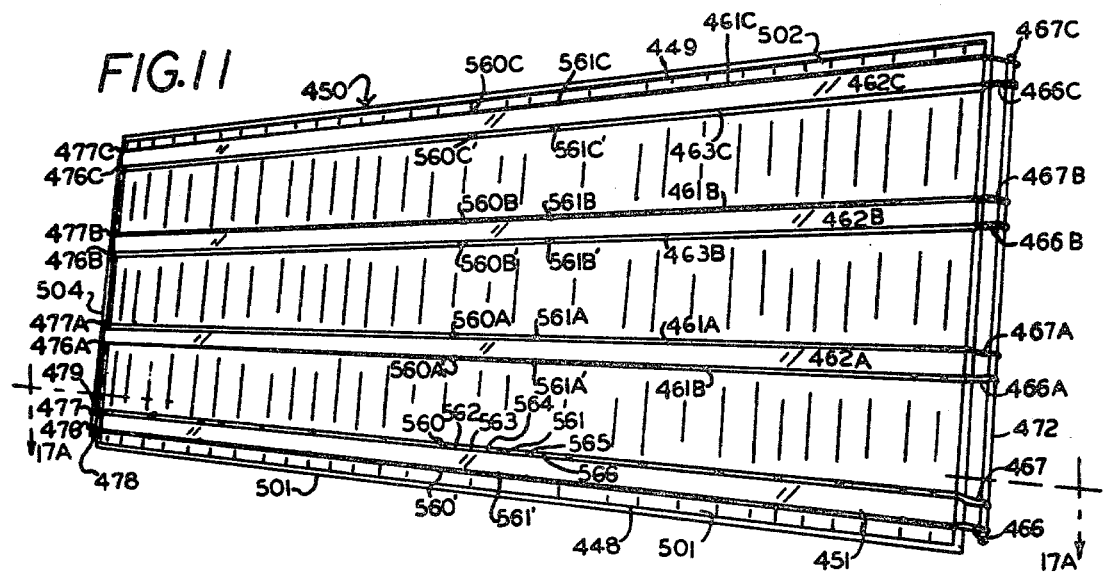
FIG.11
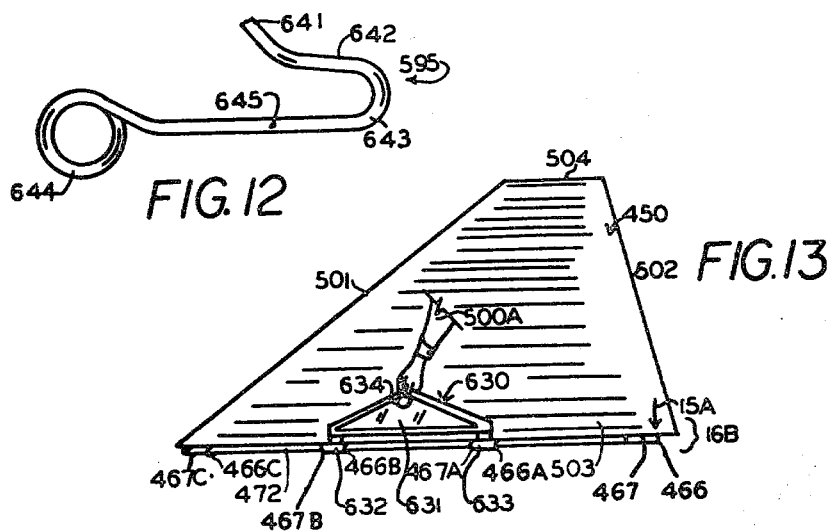
FIG.12
FIG.13
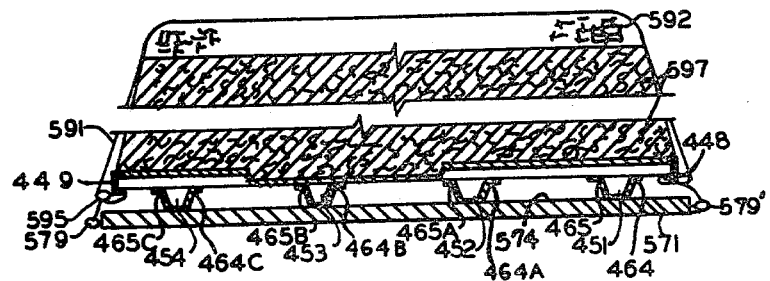
FIG.14

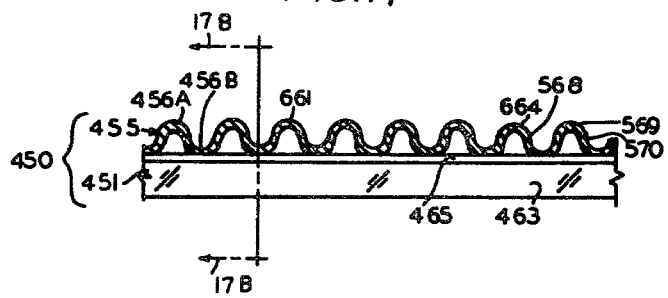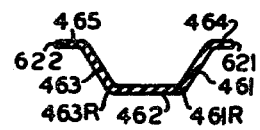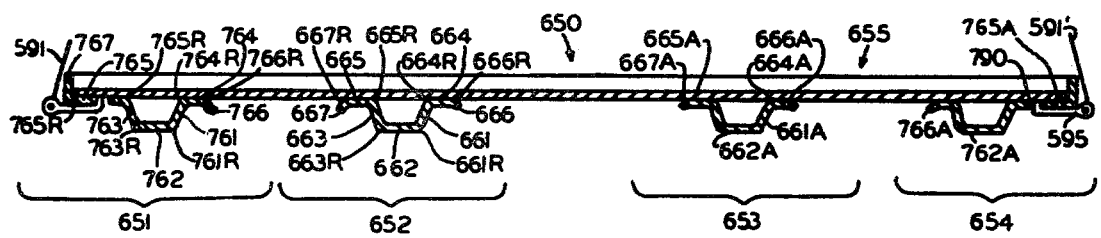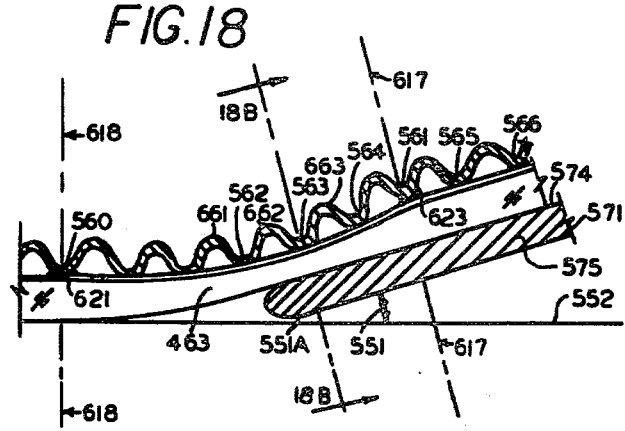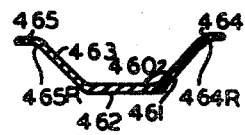

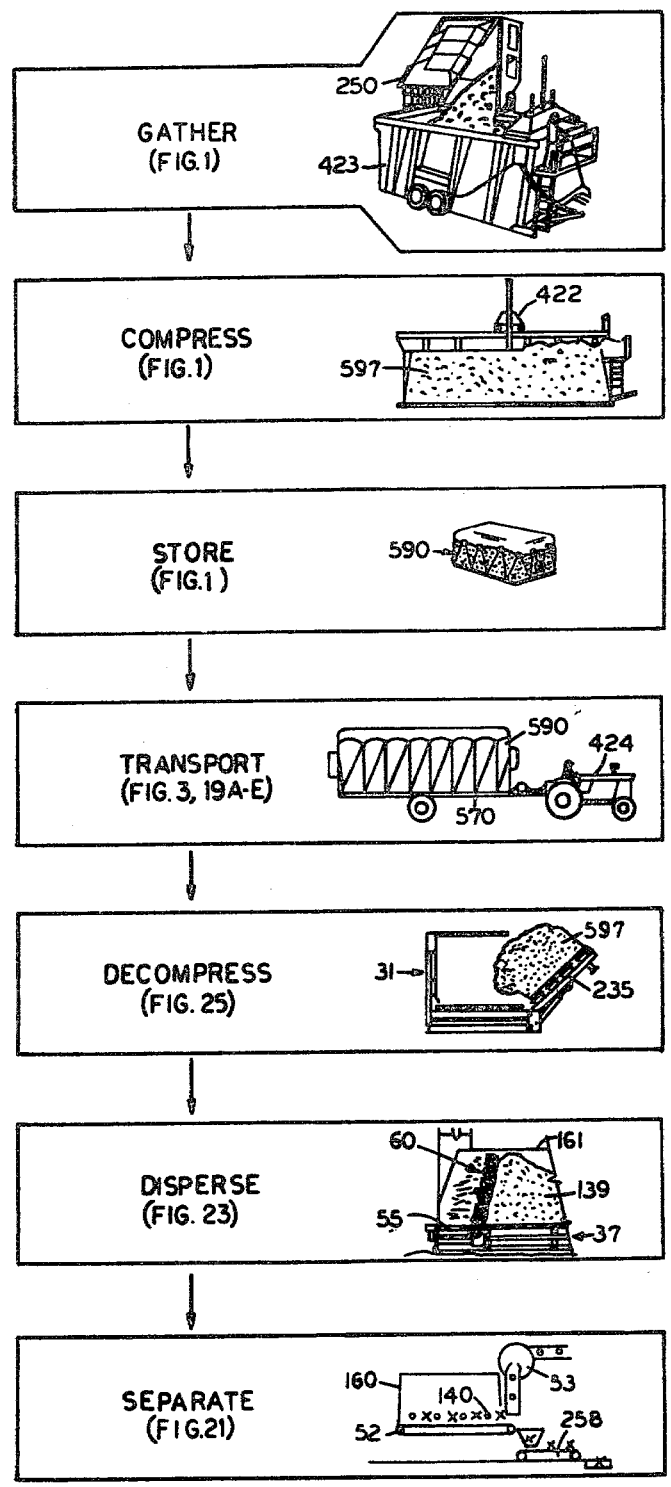

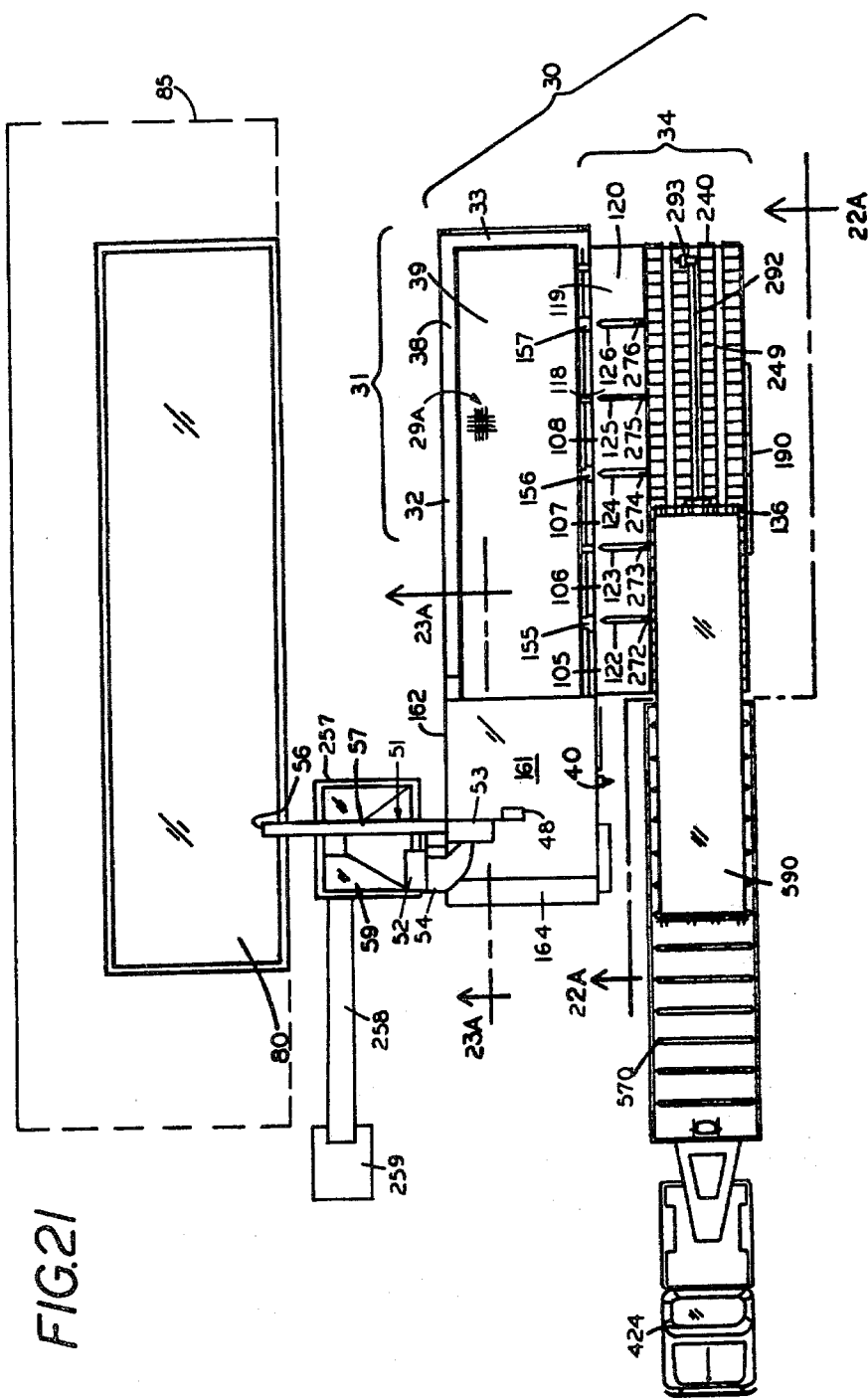

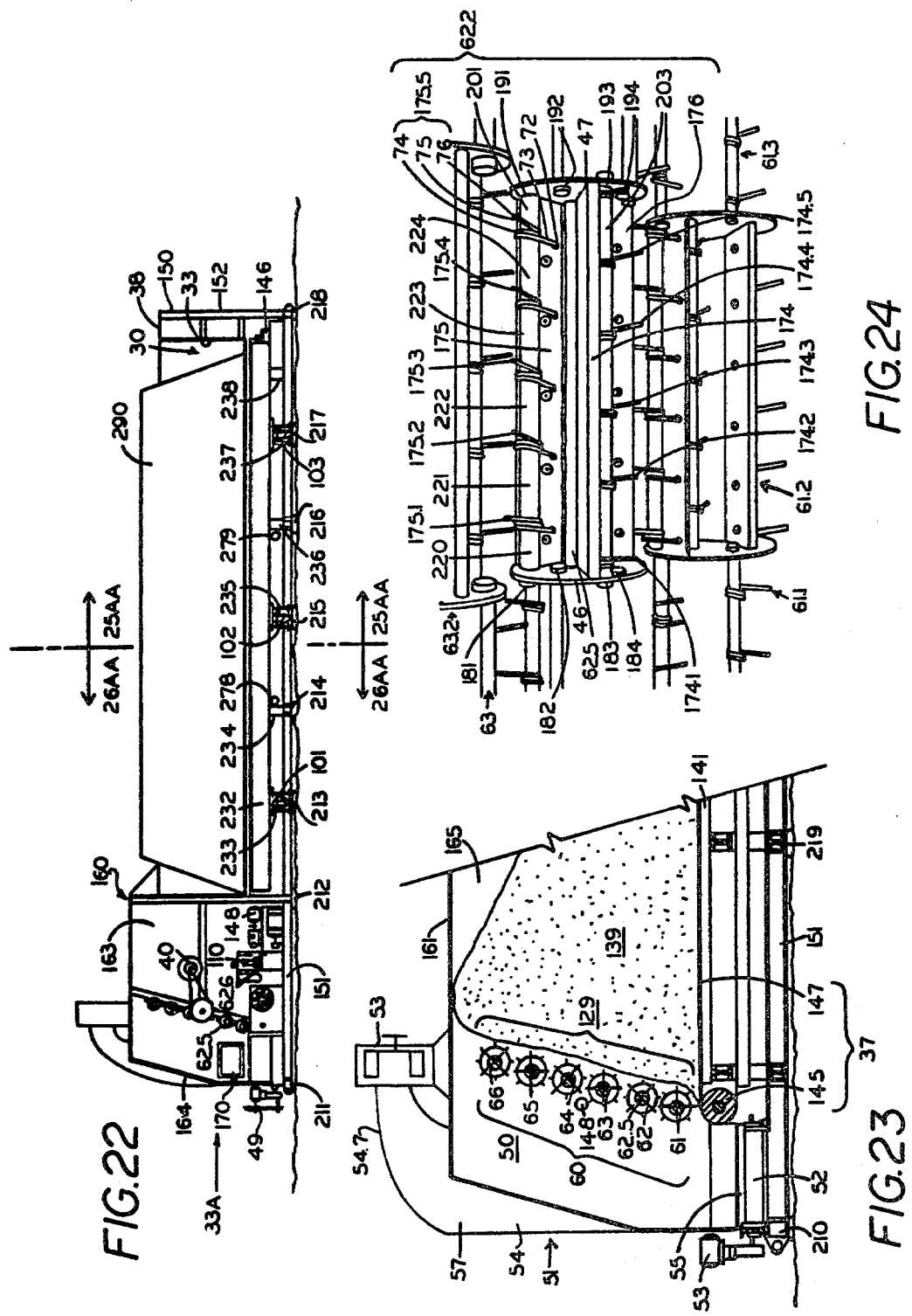

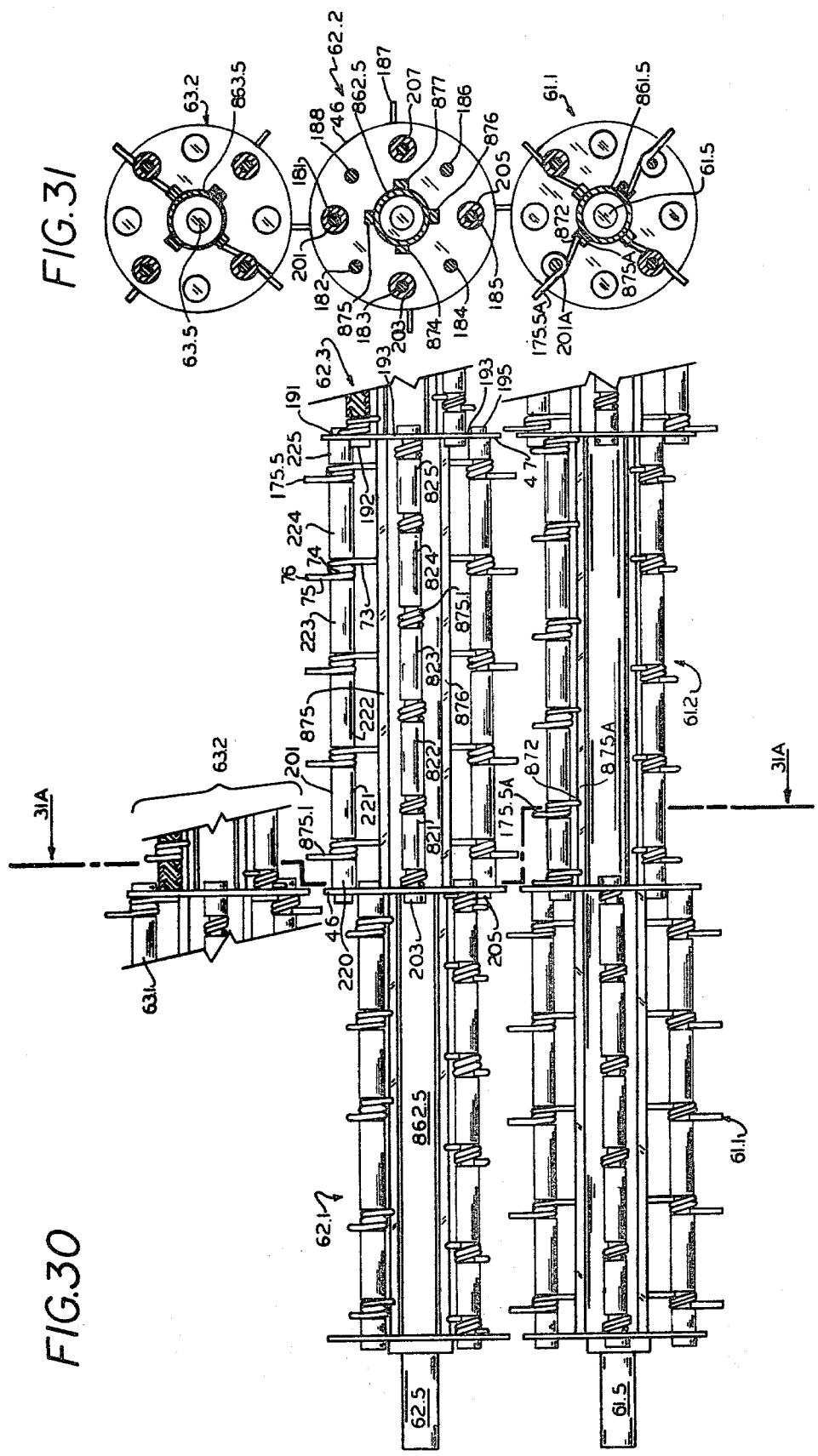

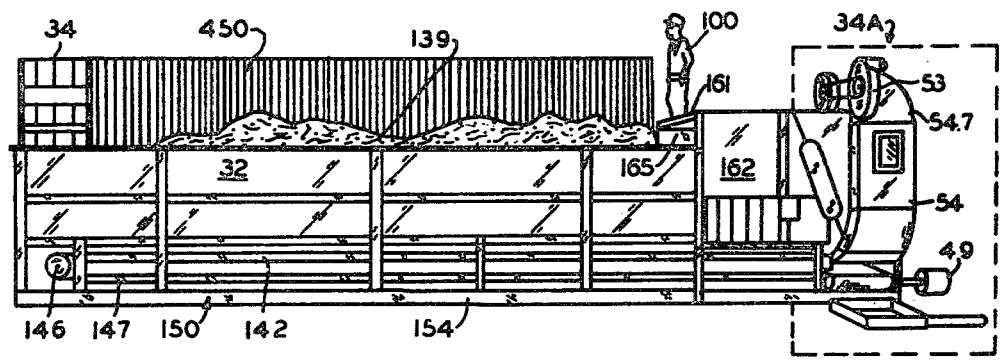
FIG. 32
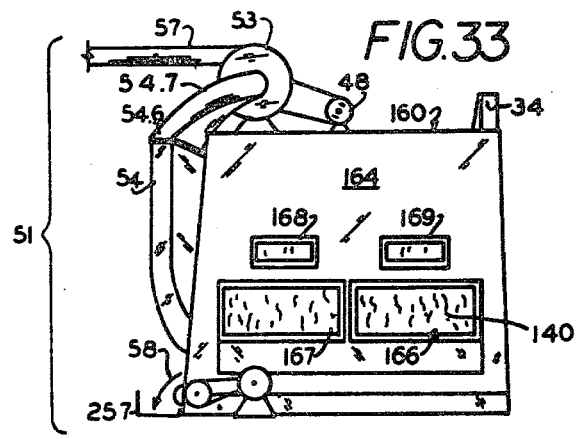
FIG. 33
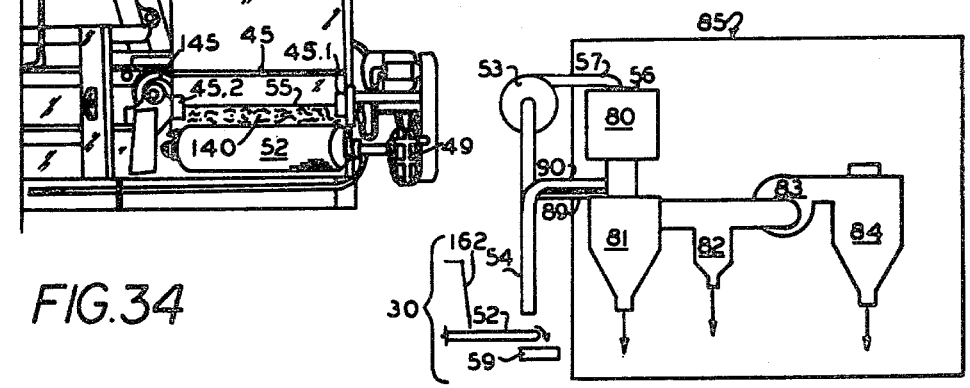
FIG. 34
FIG. 35

INSERT A:

TABLE I: DIMENSIONS OF APPARATUS 30

| | |
|---|---|
| Width of chamber 39 (interior of wall 32 to interior of apron 21 in vertical position as in FIGURE 5C) | 9' 11" |
| Frame 150: Length | 50' 9" |
| Width | 11' 6" |
| Length of belt conveyor 137 (axle of drive pulley 145 to axle take up roller 146) | 45' |
| Height of roof 61 (belt 147 to roof 161) | 8' 0" |
| Width of Chamber 160, interior | 9' 11" |
| Center rod 201 to center 202 | 9" |
| Center to center distance 46-47 | 29" |
| Diameter of plates 46 and 47 | 12" |
| Length 73 and 75, each | 3" |
| Tip 76 to centerline 62.5 | 8" |
| Loop 74, outside diameter | 1-1/2" |
| Shaft 61.5 diameter | 2" |
| Frame 24: Width | 8' 0" |
| Length | 36' 0" |
| Apron 250: Width | 4' 0" |
| Distance, shafts 61.5 to 62.5, centerline to centerline | 1' 2-7/8" |
| Left door: Width | 8' 0" |
| Conveyor 52 belt width | 3' 0" |
| Height roof 160 over ground | 10' 10" |
| Height wall 32 | 9' 0" |
| Length wall 32 | 38' 3" |
| Belt 147 Width | 9' 10" |
| Pulley 145 diameter | 21" |

INSERT A: TABLE I: DIMENSIONS OF APPARATUS 30, Continued:

Throughput of apparatus 30,
   in bales of seed cotton

Per hour                                              30 bales/hr.

Corresponding weight of cotton
   treated, in pounds per minute                         1500 lbs./min Corresponding speed of belt in
   inches per minute                                     20 in./min.

Power capacity at dispersing
   assembly 41 for such throughput
   (motor 40)                                            15 H.P.

Power capacity for feed belt                          10 H.P.

Speed of belt 147--range
   (inches/minute)                                       0 to 48 in./min.

FIELD TO COTTON GIN HANDLING AND STORAGE SYSTEMS

RELATED APPLICATIONS

This is a division of application Ser. No. 759,392 filed Jan. 14, 1974 now U.S. Pat. No. 4,127,061 which is a division of my co-pending application Ser. No. 568,004, filed Apr. 14, 1975, entitled FIELD TO GIN COTTON HANDLING AND STORAGE SYSTEMS, now U.S. Pat. No. 4,031,003 issued June 21, 1977, which in turn is a continuation-in-part of both my patent application Ser. No. 513,145 filed Oct. 8, 1974, now abandoned, and my patent application Ser. No. 428,384, Dec. 26, 1973; now U.S. Pat. No. 3,879,049 issued on Apr. 22, 1975.

BACKGROUND OF THE INVENTION

1. The Field of the Invention

The fields of art to which this invention pertains are seed cotton forming, loading and transport and pre-ginning treatment and apparatus therefor.

2. Description of the Prior Art

The prior art has suffered with economically inefficient transportation of field cotton at low bulk density and, where high bulk density has been used, from mechanical difficulties in ginning the product, especially where large amounts of trash are collected by machine picking.

SUMMARY OF THE INVENTION

By this invention, a practical and efficient system of compression for storage and economically as well as mechanically efficient transportation is combined with a pre-ginning treatment that provides a cotton of improved ginning characteristics. D The apparatuses and process steps of this invention provide a complete field to gin cotton handling and storage system comprising the sequence of steps of: (a) gathering and compression of harvested cotton to form a module thereof of 12 to 14 pounds per cubic foot density; (b) storage and transport of the cotton module on a pallet particularly adapted for use in the apparatus wherein the compression is applied to such cotton for its transport as well as storage and other handling in an apparatus to break the module; (c) after storage and transport, the module mass on the pallet being handling to so be broken into variable lengths of high but limited bulk density and then being so held and moved so as to provide a self-regulating feed density to a threshing zone whereat the cotton bolls and trash are automatically separated and the bulk density of the cotton is reduced to 2 to 3 pounds per cubic foot; and (d) the thus produced low density mass of intermixed cotton and trash being passed to a pneumatic separator at the gin whereat the thus-produced low bulk density cotton is separated from trash, twigs and like refuse gathered during normal mechanical cotton picking.

BRIEF DESCRIPTION OF THE DRAWINGS

FIG. 1 shows (a) the mobile press assembly 421 during its operation of forming a module and (b) a loaded pallet assembly 590 formed therewith.

FIG. 2 is a diagrammatic vertical sectional view of a stage in the step of covering of the mass formed on the pallet 450.

FIG. 3 is a diagrammatic showing of a stage in step of drawing loaded pallet assembly 590 on a trailer 570.

FIG. 8 is a top oblique view along direction of arrow 8A of FIG. 5 showing detail of the connection of the plunger cylinder 437 to its support.

FIG. 9 is a rear view along direction 9A of FIG. 8.

FIG. 10 is a diagrammatic isometric illustration of the principal parts of the plunger assembly 422.

FIG. 11 is a perspective view of the bottom of pallet 450.

FIG. 12 is a full scale side view of a hook element 595 used with the pallet 450 in loaded assembly 590 of FIGS. 1 and 3.

FIG. 13 is an oblique top view of the pallet 450.

FIG. 14 is a transverse vertical sectional view along vertical plane 14A—14A of FIG. 19E but on a different scale.

FIG. 17 is a diagrammatic longitudinal vertical section of portion of pallet 450 in zone 17C of FIG. 3 along plane 17A—17A of FIG. 11.

FIG. 17A is a transverse vertical sectional view at plane 17B—17B of FIG. 17. FIG. 17B is a transverse vertical section of a pallet 650 in a transverse vertical section such as plane 17B—17B to illustrate other runner structures.

FIG. 18 is a diagrammatic transverse longitudinal sectional view along plane 17A—17A of FIG. 11 at zone 18C of FIG. 3.

FIG. 18A is a transverse vertical sectional view along plane 18B—18B of FIG. 18. FIGS. 17, 17A, 18 and 18A are diagrammatic and exaggerated for purpose of illustration to demonstrate the change in shape of runner walls as 461 and 463 relative to the base sheet 462 during transfer of the loaded pallet assembly 590 to the trailer 570 also, in FIG. 18, the attachment of runner 451 to the sheet 455 is shown at exaggeratedly widely spaced apart lower points 560 and 561 of pallet 450 by spot welds 621 and 623 to illustrate the bowing of side wall plates 63 relative of base plate 62 in zone 18C.

FIG. 20 is a diagrammatic presentation of the process steps of the overall system of this invention and an apparatus train used therefor.

FIG. 21 is a plan view of the pre-ginning module testing apparatus 30 during the stage of loading a pallet and module on the lift door assembly 34 of apparatus 30.

FIG. 22 is a side view of the pre-ginning apparatus 30 as seen along plane 22A—22A of FIG. 21.

FIG. 23 is a longitudinal vertical section along the vertical plane 23A—23A of FIG. 21 to show the interior of the disrupter assembly and, diagrammatically, the mass being treated thereby during operation of the apparatus 30.

FIG. 24 is a perspective view of some of the disrupter reel units in one embodiment of reel.

Portion 26C shows the lift door in extended position for receiving a fresh pallet with module thereon. FIG. 17 is a side scale view of apparatus 30 as seen along direction 27A of FIG. 25 with the door assembly 34 vertical, as in portion 25C of FIG. 25.

FIG. 30 is an enlarged rear diagrammatic scale view of a portion of another embodiment of disrupter reel assembly 41.

FIG. 31 is a vertical transverse sectional view along section 31A—31A of FIG. 30.

FIG. 32 is a pictorial side view of apparatus 30 as seen along direction of arrow 32A of FIGS. 25 and 26 when a mass as 139 resulting from emptying a module as 133 in chamber 39 as shown in FIG. 25 and the door assembly is raised as shown in portion 2A of FIG. 26.

FIG. 33 is a front end view of apparatus 30 as seen along the direction of arrow 33A in FIG. 22.

FIG. 34 is an enlarged side view of zone 34A of FIG. 32.

FIG. 35 is a diagrammatic showing of units in assembly 85.

FIGS. 21, 22, 23, 25, 26, 27, 28, 29, 30, 32, 33 and 34 are to scale although not all to the same scale: FIGS. 25 and 26 are to the same scale and FIG. 24 is pictorial. FIGS. 27 and 28 are to the same scale.

Figure 4:
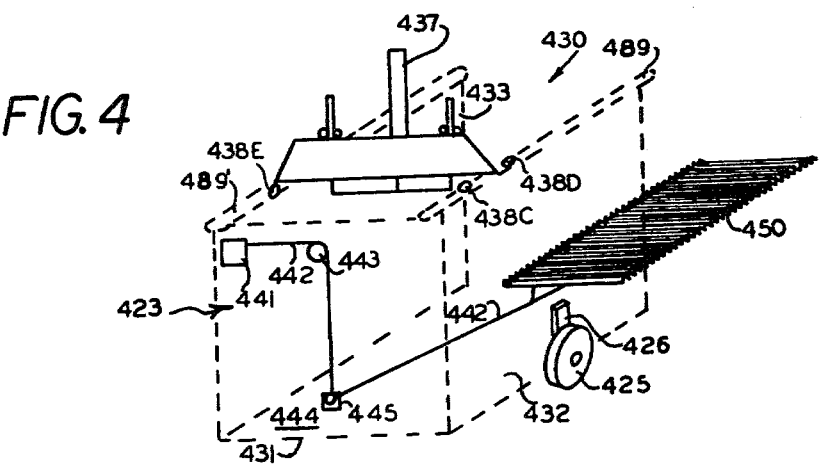
FIG. 4 is an isometric diagrammatic phantom view of a stage of drawing the pallet 450 into the mobile press assembly.

In the preferred embodiment, dimensions of the apparatus 30 are as set out in Table I.

TABLE I:

| DIMENSIONS OF APPARATUS 30 | | |
| --- | --- | --- |
| Width of chamber 39 (interior of wall 32 to interior of apron 21 in vertical position as in FIGURE 5C) | 9' | 11" |
| Frame 150: Length | 50' | 9" |
| Width | 11' | 6" |
| Length of belt conveyor 137 (axle of drive pulley 145 to axle take up roller 146) | 45' | |
| Height of roof 61 (belt 147 to roof 161) | 8' | 0" |
| Width of Chamber 160, interior | 9' | 11" |
| Center rod 201 to center 202 | | 9" |
| Center to center distance 46–47 | | 29" |
| Diameter of plates 46 and 47 | | 12" |
| Length 73 and 75, each | | 3" |
| Tip 76 to centerline 62.5 | | 8" |
| Loop 74, outside diameter | 1¼" | |
| Shaft 61.5 diameter | | 2" |
| Frame 24: Width | 8' | 0" |
| Length | 36' | 0" |
| Apron 250: Width | 4' | 0" |
| Distance, shafts 61.5 to 62.5, centerline to centerline | 1' | 2⅞" |
| Left door: Width | 8' | 0" |
| Conveyor 52 belt width | 3' | 0" |
| Height roof 160 over ground | 10' | 10" |
| Height wall 32 | 9' | 0" |
| Length wall 32 | 38' | 3" |
| Belt 147 Width | 9' | 10" |
| Pulley 145 diameter | | 21" |
| Throughput of apparatus 30, in bales of seed cotton Per hour | | 30 bales/hr. |
| Corresponding weight of cotton treated, in pounds per minute | | 1500 lbs./min |
| Corresponding speed of belt in inches per minute | | 20 in./min. |
| Power capacity at dispersing assembly 41 for such throughput (motor 40) | | 15 H.P. |
| Power capacity for feed belt | | 10 H.P. |
| Speed of belt 147—range (inches/minute) | | 0 to 48 in./min. |

DESCRIPTION OF THE PREFERRED EMBODIMENT

In general, the apparatus for the overall system shown in FIG. 20 comprises a mobile press assembly 421, a pallet assembly 450, a loaded pallet assembly 590, a tilt bed tractor 570, and a module treating assembly 30. The combination of units operates as an overall system to effectively transport and treat field cotton.

The mobile press assembly 421 is structured to load a pallet with a mass of vertically compressed seed cotton at a uniform density without development of horizontal or lateral compressive stress as might, after removal of the loaded pallet from the mobile press, result in extrusions of the compressed seed cotton. The pallet, while light enough to be handled by manual labor, is formed to provide such limited bowing that no compression is developed in the mass thereon as results in permanent disruption of the even interior density and surface of the loaded mass during movement of the loaded pallet to and from a tilt bed trailer transport therefor, transport on the trailer, and storage in the field or at the gin yard.

The pallet for this purpose comprises an imperforate water-impermeable transversely grooved thin corrugated sheet and a plurality of parallel longitudinally extending like runners, each runner composed of two like vertically extending outwardly sloped side walls and a bottom flat smooth horizontal sheet, the side walls firmly yet resiliently joined at corners along the total length of their bottom edges to the total length of the left edge and right edges, respectively, of the bottom sheet and extending upwardly therefrom and the sheet is firmly connected to the top of the side walls at regularly longitudinally spaced apart points at greater distances than the points of contact of said sheet and said runners and the height of the sheet varies in periodic and uniform continuous manner from lowest points to highest points, and intermediate portions of the sheet extend vertically therebetween and are continuous therewith and provide support for its horizontally extending portions.

The apparatus 30 for treating the high density storage stable transportable module to form readily ginned mass of low density cotton comprises a feeder compartment to a dispersing element whereat the trash and cotton bolls are separated. The feeder compartment receives a large module of mechanically harvested cotton on a movable loading frame, the loading frame empties into that compartment from an elongated side of that feeder compartment and thereby provides for a particularly rapid and efficient unloading of the transport apparatus of the system; such unloading is accomplished by a lift door assembly, including an apron movably located within that lift door assembly and below the upper surface of the movable loading frame on which the module is loaded; this combination of movable loading frame and apron provides for adjustable lateral location of the movable loading frame for acceptance of the transport pallet on the upper surface of the lift door assembly. The lift door has a clamping assembly with which to hold the pallet and the cotton module located whereon for movement of that high density module into the feeder compartment. Such module movement into the feeder compartment is accomplished in a manner to break the module into small masses of lower bulk density in said feeder compartment. The belt conveyor on which the broken module is fed permits the broken cotton module mass to slide thereon and releasably, yet efficiently, feeds the mass to the dispersing elements. The dispersing elements have a large but uniform orifice through which to pass cotton bolls and trash when separated from each other and the dispersing units provides a sufficiently high energy input to handle the reduction in bulk density of the fed mass (of 12 to 14 pounds per cubic foot to 2 to 3 pounds per cubic foot in the product at a rate of 30 bales per hour). The belt cooperates with the apparatus frame to confine the mass of harvested cotton and trash and provides a gradually increasing bulk density through the relatively elastic mass of cotton thereby developed to provide a substantially constant rate of feed to the dispersing elements whereby a low density detrashed cotton product is made and a uniform action thereon is provided. The trash and cotton then are separated by an air separator, with the thus purified cotton passed to a gin whereat the thrashing action provided by the dispersing units is reflected in the improved ginning characteristics of the product.

The disrupting assembly 41 is also hereinbelow referred to as the dispersing assembly because it disperses the components of the mass (139) presented thereto by the belt (147) in the module treating assembly 30.

The picked cotton treated by the apparatus 421 to produce a bulk density of between 10 and 15 pounds (preferably 12 to 14 pounds) per cubic foot and in that condition of density stored on pallet 450 and later transported to the module treating assembly 30 has a density of 2 pounds per cubic foot when it comes through the dispersing unit 41 while strip cotton has a density of 2¼ pounds to 2½ pounds per cubic foot when correspondingly treated.

The Mobile Press Assembly

The mobile press assembly 421 comprises a plunger subassembly 422, a container sub-assembly 423, and a tractor 424. The mobile press assembly comprises the plunger subassembly 422 supported on the container subassembly 423; assembly 423 is attached to and drawn by the tractor 424. The container subassembly comprises a plurality of rigid vertical walls 431-4, i.e. a front wall 431, a left side wall 432, a right side wall 433 and a movable rear wall 434. Lateral to each of the left and right walls are rotatable wheels at 425 and 425', with vertically adjustable wheel supports at 426 and 426' which are firmly attached to walls 432 and 433 provided with wheel support lifting means 427 and 427'. A power supply 440 comprising a hydraulic pump and high pressure reservoir is connected to each such wheel support lift means.

The walls 431-4 enclose a container chamber 430 open at its top. The power supply box 440 is fed by hydraulic input power lines 440' from tractor 24 and is connected by lines as 439 to the wheel support lift means 427 and 427' so that the container subassembly will be elevated over the ground by such wheels during transport of that container subassembly while drawn by the tractor 424. Container chamber 430 is wider at its bottom than at its top and has the same width at its top from front to rear of the walls 432 and 433 and has the same width at its bottom from front wall 431 to rear wall 434.

Such a mobile press assembly is generally shown in U.S. Pat. No. 3,749,003; although the mobile press assembly 21 herein is different from that described in such U.S. Pat. No. 3,749,003 in regard to the tamping or plunger subassembly 422 and the method of aligning the empty pallet by virtue of the use of the winch 441 and cable 442 on the container subassembly.

The lifting means 427 and 427' comprise means for controllably moving the wheels 425 and 425' relative to the walls 431–434. Such means include hydraulic piston cylinders 600 and 601 which are supported on horizontal frame members as 602 and 603 and hydraulic actuation means therefor. The members as 602 and 603 are supported on rigid vertical side wall frame members as 604 and 605 and 606. Each piston shaft as 608 is movable in a cylinder as 200 and 201 attached to wheel supports 426 and 426'; actuation of the hydraulic pistons movement of the shaft moves the wheel relative to the walls 31–34.

A winch 441 is supported on the front wall 431 of the container subassembly has a cable 442 wound thereon. The cable 442 passes through a top guide 443 to a bottom guide 444 around cable wheels as 445 through guide 444 whereby to be operatively connected to and act upon the pallet 450 generally as shown in FIG. 4.

The loaded pallet assembly 590 is transported by lifting to and movement on a tilt bed tractor as shown in FIG. 3. Tilt bed tractor 570 comprises a bed 571 and a set of wheels 572. The trailer bed 571 is a rigid flat topped frame of rectangular shape as seen from above with a pointed straight rear end 575 and a straight front end 576 the front end firmly supports a hitch 557 for connection to hitch 428A of tractor 424; a bed winch 573 is mounted on the head end or front end 576 of the bed 571 to move the loaded pallet assembly on the bed 571, as shown in FIG. 3. The rear bed end 575 terminates in a pointed nose or end. Such a trailer is shown in U.S. Pat. Nos. 2,487,325 and 2,452,681.

Pallet Assembly 590

The loaded pallet assembly 590 comprises a pallet 450, cables as 591 and 591', a tarpaulin 592 with grommets as 593 hooks as 595 and a cotton mass 597. The mass 597 of cotton bolls is a uniformly compressed mass of 12 to 14 pounds per cubic foot density and its top is covered by a heavy duck waterproof tarpaulin 592, provided with grommets as 593 near its sides; each cable as 591 extends through the eyes of the tarpaulin (eight on each side of the tarpaulin, evenly spaced along a 24 foot length, although only four are shown in FIG. 3) and the eyes as 644 of hooks as 595. The hooks as 595 (and like hooks as 481-485) are firmly connected to the pallet 450.

A conventional power take off on tractor 424 drives a pump 440C that is supported on frame of tractor 424 and operatively connected to power lines as 440' to power supply box 440 and contact valves as 446 and 440A (FIG. 10) for movement of the container subassembly 423 and the plunger subassembly 422. Mass 597 is 8 feet high, crowned higher in its middle than at its sides and ends. Pallet 650 operates as does pallet 450 in assembly 590. The structure of pallet 650 and 450 differs only in the structure of the runners (451-454 for pallet 450, 651-654 for pallet 650).

The Tamping Subassembly 422

The tamping or plunger subassembly 422 is movably yet firmly supported on top of and is movable longitudinally of the container subassembly 423. The plunger subassembly comprises a plunger shaft 435, a tamping or plunger head 436 a plunger cylinder 437, a transverse plunger support 438 and a left and right plunger support guide 489 and 489'. The plunger support 438 is a rigid transversely extending frame composed of front and rear transverse frame members 438A and 438B firmly joined together (see FIGS. 6 and 8). The frame has side wheels 438C and 438D and 438E and 438F movably supported on the rigid horizontal head guides 489 and 489' on top of the walls as 432 and 433 of the container subassembly 423 Cables 439B and 439C attach to and move the frame 438 longitudinally of the walls 432 and 433.

Figure 5:
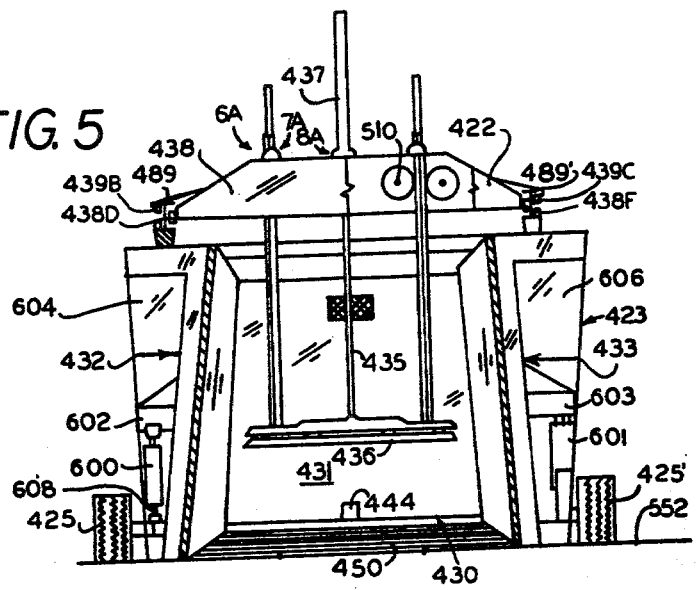
FIG. 5 is a transverse vertical sectional view of the empty mobile press assembly 421 along the vertical plane 5A—5A of FIG. 1.

A rigid plunger cylinder 437 is supported on frame 438 and extends upward vertically in its operative position, as shown in FIGS. 1 and 5; a plunger shaft 435 is slidably located in cylinder 437 for movement upward or downward, as determined by a press control valve 446. The bottom end of plunger shaft 435 is firmly attached to the head 436 whereby on activation of the shaft, the flat transversely extending head 436 may compress material as 578 held within the container chamber 430.

Head 436 is a rigid horizontally extending flat bottomed plate that extends horizontally slightly less than the width of the top of container chamber 430.

The plunger subassembly 422 comprises units therein that specifically provides for maintaining the plunger head 436 level during tamping and leveling the mass of cotton in chamber 430 while operating quietly and without depositing grease on the mass of cotton tamped therewith, and in a reliable manner without requiring maintenance over long periods of operation.

Figure 6:
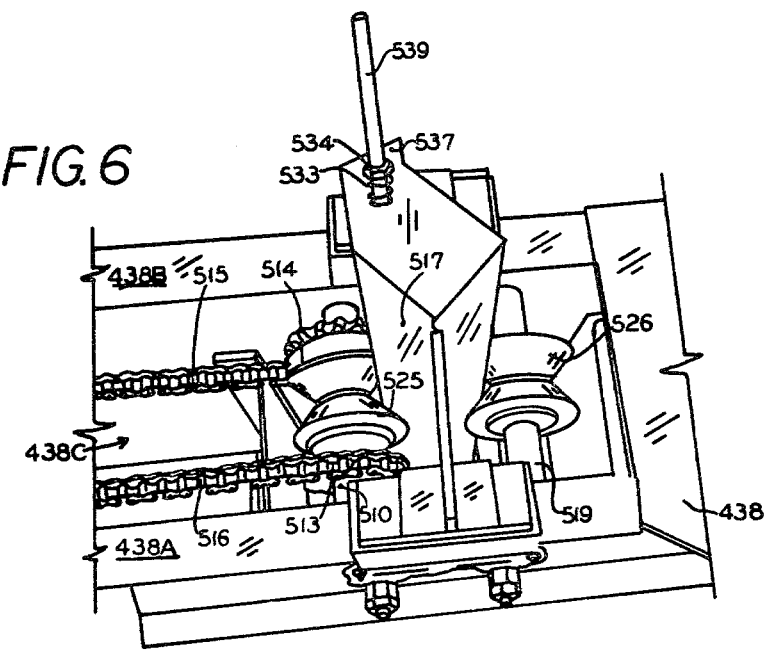
FIG. 6 shows a portion of the press assembly as seen along direction of arrow 6A of FIG. 5 and pictorially showing mechanisms on the outer side and rear of one vertical post 517 of plunger assembly 422.

More particularly, the transverse rigid frame 438 supports a plurality of chain supporting guide sprocket wheel 511-514, i.e., rear right chain guide sprocket wheel 511 and front right chain guide sprocket wheel 512 are rotatably supported on an rigid axle 520 while the corresponding front left chain guide sprocket wheel 513 and rear left chain guide sprocket wheel 514 are supported on a right inner axle 510. Each axle as 510 also supports an inner left guide roller 526 while an outer guide roller 526 is supported lateral to the left guide post 517 on a left outer axle 519 (FIG. 6).

Figure 7:
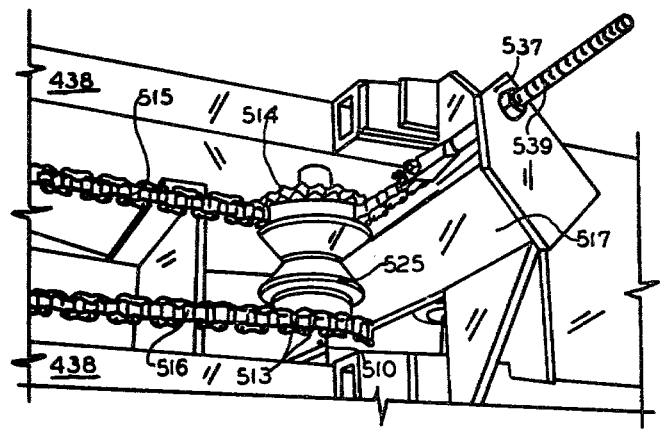
FIG. 7 is a detail of the press assembly as seen along arrow 7A of FIG. 5 showing mechanism on inner side of vertical post 517 of the plunger assembly 422.
Figure 15:
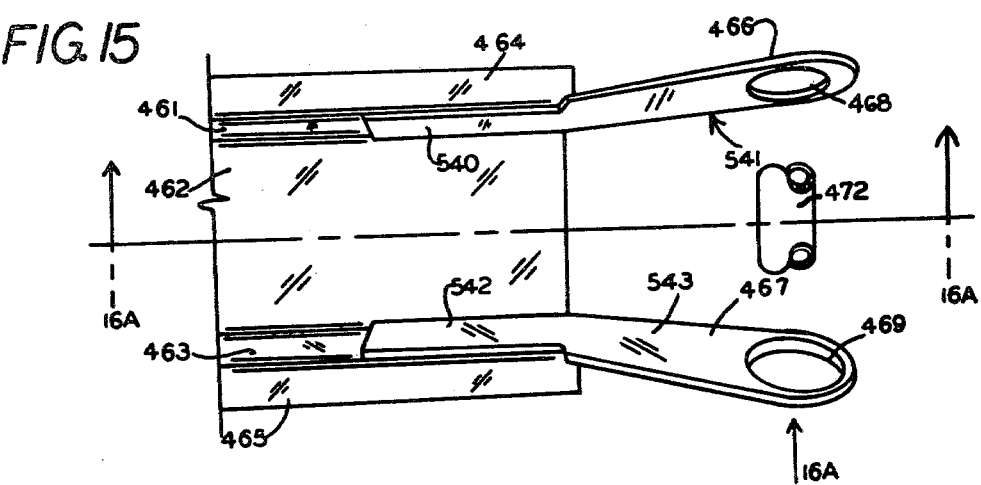
FIG. 15 is a top view of the front end of a runner 451, generally as seen along direction of arrow 15A of FIG. 13, with plate 455 removed therefrom and is drawn to scale.

A flexible left top control chain 515 extends from an upper bracket 537 firmly attached to top of the left post 517 via an adjustment rod 539 with a nut 534 thereon (as in FIG. 7 and FIG. 6) to engage teeth on the bottom and outer side of the guide sprocket wheel 514 and, thence to the top teeth of sprocket guide wheel 511 to attach to a bracket 535 at the bottom of the vertical right post 518 near the junction of that right post to the head 436 as diagrammatically shown in FIG. 10. Adjustment rod 539 has a nut 534 thereon and a spring or lock nut 533 thereunder and provides for tightening of the chain 515.

The middle portion of a flexible right top chain 516 identical in structure and size to chain 515 extends over and engages teeth at the top of left side guide wheel sprocket 513 and extends to and engages the bottom teeth of sprocket guide wheel 512.

The lower end of the left chain 516 is attached to a bracket 536 on the left side of head 536 near the bottom end of post 517. The top end of the right chain 516 extends to an adjustment rod like 539 with a spring supported nut like 534 on a bracket 538 on top of vertical post 518 like bracket 537 on post 517.

The chains 515 and 516 are flexible but dimensionally stable and their attachments to the vertical guides 517 and 518 and head 436 provide that on actuation of the piston shaft 435 in cylinder 437 the bottom face of the plunger head 436 is maintained level or horizontal on its upward and downward motions and on compression of the material as 578 in the container chamber 430 due to the movement of that head against such material and toward the pallet 450 therebelow.

A three-way valve 446 under control of an operator as 500, applies hydraulic fluid to the piston 447 top or bottom to move the shaft 435 (attached to the piston 447 at its top and head 436 at its bottom) and head 436 down and up to tamp the cotton 587 in chamber 430. The valve 446 may also position the head 436 at a fixed vertical height, whereat the head 436 is moved longitudinally along length of chamber 430 on guides 489 and 489' while driven by motor 439A through chains 439B and 439C which chains are attached to frame 438 (see FIGS. 5 and 10) to even out or level the top of the mass of cotton bolls in chamber 430 prior to tamping.

The combination of posts as 517 and 518 vertically movable on rotary guides 525 and 526 for each post, chains as 515 and 516, wheels 511-514 and hydraulic piston of subassembly 422 provides a reciprocatory mechanism to tamp and capable also of exact location to level out the cotton in chamber 430. Because the exposed surfaces of posts 517 and 518 and wheels as 525 and 526 are guide surfaces rather than driving and driven surfaces, such action of the subassembly 422 is accomplished without such an application of grease to surfaces on moving parts of subassembly 422 as would effect the surface characteristics of the mass of harvested cotton bolls 587 located in chamber 430. The reciprocation of the head 436 of subassembly 422 is thereby accomplished quietly so that the operator 500 may manipulate the plunger or tamping subassembly 422 while in voice contact with the operator 555 of a harvester 550 dumping cotton into chamber 430 as shown in FIG. 1. Further, the subassembly 422 is free of shocks (present in usual mechanical gear devices) that cause high wear rates and mechanical failure at inopportune times when cotton is dumped into the container chamber 430 over its top, as shown in FIG. 1, from a harvester 550; the mass 578 in chamber 430 initially has a pyramidal shape with narrow top and may be asymmetrical to front or rear or to one side or the other; notwithstanding the usual asymmetry of such load to which the press head 436 is applied, the subassembly 422 provides a vertical compression of such mass 587 in chamber 430 without any lateral component of stress applied by that press head.

Cylinder 437 is supported near its bottom in clamp 553 and 554 and is attached at its bottom to a rigid plate 522. Plate 522 is supported on movable rods 523 and 523A thereabove in frame 438. Rods 523 and 523A are located in a slot 523C on top of a rigid ell 523D in plate 438A of frame 438 and on a similar slot and ell 523E in plate 438B of frame 438. This compression provides for a stable mass or bale on top of the pallet 450 when the module formation, according to this process of operation of this apparatus, is completed.

The mounting of the cylinder 437 thus provides for release of the support plate 522 by removing the support rods 523 and 523A (which are locked into place on ell 523D by the nuts 524 and 524A). The cylinder 437 may then move downward through the slot 438C between frame members 438A and 438B and may be moved downward from position shown in FIGS. 1 and 5 for transport purposes without any further disassembly. When operational assembly of portable press assembly 421 is desired, the piston cylinder 437 is moved up on shaft 435 by actuation of the hydraulic liquid pressure in cylinder 437 until the plate 522 is in position as in FIG. 8 whereat the support rods 523 and 523A may be located in the plates 438A and 438B.

The action of plate 436 of plunger assembly 422 avoids any development of horizontal or lateral compressive stress as might, after removal of the loaded pallet 590 from the restraining action of walls 433 and 432 (and 431 and 434) result in extrusion of portions of the mass 597: the tarpaulin has no direct influence on lateral escape of the compressed mass 597.

Pallet 450

The pallet 450 comprises an imperforate water impermeable transversely grooved surface formed of a thin corrugated imperforate steel sheet 455 and a plurality of parallel longitudinally extending runners 451, 452, 453 and 454. Each runner as 451 is composed of a left vertically extending yet outwardly sloped left side wall 461, a bottom flat smooth horizontal sheet 462, a right vertically extending outwardly sloped side wall 463, a top left flange 464, a top right flange 465, a rounded front left end plate 466, a front right end plate 467, a rear left end plate 476, a rear right end plate 477. The left side 461 and the right side 463 are firmly yet resiliently joined at softly rounded (3/16 inch radius) corners as 461R and 463R along the total length of their bottom edges to the total length of the left edge and right edges, respectively, of the bottom sheet 462. The sheets 461, 462, 463, and flanges 464 and 465 are formed of thin medium carbon sheet steel (0.05 inch thick) resilient yet springy and formed by cold drawing a plate of such material.

The upper end of each of sides 463 and 461 are joined by corresponding soft rounded corners 464R and 465R to flanges 464 and 465, respectively.

The left side edge joins at its front end a rigid metal front left plate 466 with a hole 468 therein while the right side 463 is joined to a rigid front right plate 467 with circular hole 469 therein. The left side joins a rigid rear left plate 476; the right plate joins a rear right end plate 477 wth holes 478 and 479, respectively, therein. These holes 478 and 479 in member 476 and 477 and the like holes 468 and 469 in members 466 and 467 locate a rigid cylindrical drawbar 470 at the front end and a rear drawbar 472 at the rear end.

Corresponding structures in runners 452, 453 and 454 are indicated by referent letters A, B and C, respectively; thus, bottom surface 462, 462A, 462B and 462C are the same structure in each of runners 451, 452, 453 and 454, respectively, and end plates 467, 467A, 467B and 467C are similarly formed and similarly function as herein described.

The sheet 455 is an imperforate galvanized corrugated steel sheet with a plurality of like, parallel transversely extending upwardly convex grooves as 456A and downwardly convex portions 456B thereon forming generally a sine curve. Such shape is diagrammatically shown in FIGS. 17 and 18. The top of flanges as 464 and 465 of each of the runners as 451 are firmly joined to the bottom surface of the sheet 455 at portions of such sheet, as 621 and 623 that are spaced apart from each other by greater distances than the points of contact of the sinusoidal curved sheet and the flanges 464 and 465.

As seen in longitudinal cross section, as diagrammatically shown in FIG. 17, sheet 455 is of sinusoidal shape: the lowest points on the lower surface of such surface as points 560, 562, 561, 563, 564, 565 (in FIG. 18), 567 (in FIG. 16), 456B (in FIG. 17) are in contact with the top surface of flanges as 464 and 465 (and 464A, 464B, 464C and 465A, 465B and 465C). The high points as 661–663 (in FIG. 18), 569 (in FIG. 16), 456A (in FIG. 17) are ⅝ inch above the lowest points neighboring thereto and the lowest points—like the highest points—are 2½ inch distant from each other; sheet 455 is 1/20 inch thick (26 gauge). The height of sheet 455 over flanges 464 and 465 varies in periodic and uniform continuous manner from lowest points as 560–565 to highest points as 661–669 on the sheet 455. The intermediate portions of the sheet, i.e., the portions (as 668 of FIG. 16) of the sheet 455 between the highest and lowest points as 667 and 669 of sheet 455 extend vertically therebetween and are continuous therewith. Each such portion as 668 is continuous with and provides a ribbing or support action for the horizontal portions, as the generally horizontal top sheet portion 669 near each top point as 569 in FIG. 16 of the sheet 455 and the relatively horizontal bottom portion 667 near the bottom point, as 567 of FIG. 16, of sheet 455.

The point of joining of the flanges 464 and 465 on each runner as 451 to the bottom surface of sheet 455 are abreast of each other, as shown for points of joining 560 on flange 465 and 560' on flange 464 and also for points 561 and 561' on flanges 465 and 464, respectively. The points of attachment of the flanges of runners 451, 452, 453 and 454, all the runners of pallet 450, to the bottom surface of sheet 455 are also abreast of each other, as shown in FIG. 11—i.e., at equal distances from the front drawbar 472 and the straight front edge 503 of sheet 455—for the illustrative attachment points 560, 560' on runner 451, points 560A and 560A' on flanges 464A and 465A of runner 452, points 560B and 560B' on flanges of runner 453, and points 560C and 560'C' on flanges of runner 454 while points 561, 561', 561A, 561A', 561B', 561B, 561C' and 561C are also at equal distances from 472 or abreast of each other, as also shown in FIG. 11.

Each of the end plates 466 and 467, 476 and 477 on runner 451 is like the front left plate 466 of runner 451; plate 466 comprises a rigid rectangular base solid portion 540 and a rounded trapezoidal extension member 541 formed of ⅛ inch thick steel plate. Left plate 467 comprises a corresponding base 542 of same thickness, size and shape and material as portion 540 and rounded trapezoidal extension plate 543 of same size, material, shape and thickness as 542. Each rectangular base portion as 540 and 542 is firmly attached to one side wall as 461 and 463 of the runner as 451.

The lower edge as 545 of each plate 467 lies in a plane 546 which forms a small acute angle as 547 with the horizontal plane 548 in which the lower surface of the bottom plate portion as 462 of the corresponding runner 451 lies, the intersection of planes 546 and 548 and the angle 547 are located in front of front edge 506 of bottom plate 463 of runner 451. This small acute angle 547 is a lesser angle (with such surface 548) than the angle 551 between the ground surface 552 and the top bed surface 574 at the rear end 575 of the tilting bed 571 of the tilt bed trailer 570 used to lift and transport the pallet 450 with the load of cotton 597 thereon, as shown in FIGS. 3 and 18. The bottom surface or 462, 462A, 462B, 462C of each runner as 451, 452, 453 and 454, respectively, is in contact with and may, for all practical purposes, be regarded as co-planar with the top surface 552 of the ground when the pallet is being loaded with cotton, as shown in FIG. 2. Each of the rear end plates as 476, 477 is rigid and firm and is firmly attached to rear of runner side plate as 463 and 461, respectively, as above described for plates 466 and 467. Correspondingly (to the structure of runner 451), each of rear runner end plates 476A, 476B and 476C and 477A, 477B and 477C are firmly attached to rear end of a runner side plate as 461A, 461B, and 461C and 463A, 463B and 463C. While the side plates 461 and 463 of each runner as 451 (and 452-4) are somewhat flexibly yet permanently attached to the bottom plate thereof, as 462 the welded longitudinally spaced apart attachment of the upper plates 464 and 465 to the bottom surface of layer 455 provides a sufficiently firm location and orientation of the bottom edge as 545 of each end plate as 466 (and 467) that the contact of such sloped bottom edges of the forwardly and upwardly extending portions of arms as 466A and 467A on runner 452 and 466B and 467B on runner 453 and 466C and 467C on runner 454 and pulling of rod 472 toward bed winch 573 in position of parts as shown in FIGS. 3 and 18, lifts the front edge as 503 of sheet 455 and the front edge, as 506 of each bottom plate as 462, 462A, 462B and 462C of each runner as 451, 452, 453 and 454 respectively, onto the nose of the rear end 575 of the tilting bed 571 of the bed trailer 570 as shown in FIGS. 3 and 18.

Accordingly, each runner as 451 54 is rigid at its front and rear end for lifting the loaded pallet assembly 590 onto the trailer 570 yet is sufficiently flexible and resilient at its other portions therebetween, as shown in FIGS. 18 and 18A and 19C and 19D, to avoid development of localized zones of high compressive stress as may provide for distortion or shifting of the loaded pallet assembly 590.

A pallet 450 made of only such light 26 gauge sheet 455 (about 1/32 inch thick) is adequate to carry 15,000 pounds of cotton as 597 on a pallet 455 that is 7 feet 6 inches wide and 24 feet long compressed to a pressure of about 15 pounds per square inch and having a density of 12 to 14 pounds per cubic foot. Sheets 455 and 655 are each formed of mild steel, type A.S.T.M.A-446-67, Grade E, with G-90 coating and has a minimum of 80,000 p.s.i. tensile strength; runners 451-54 and 651-654 are also mild steel type A.S.T.M.A-445, Grade D, 50,000 p.s.i. minimum tensile strength. Such a 7 foot 6 inch by 24 foot pallet weighs only 400 pounds, although pallet size ranges from 7 to 8 feet wide and 24 to 32 feet length.

A rigid front drawbar 472 passes through holes 468, 469, and like holes in runners 452, 453 and 454, the resilient hold of these plates 541 and 543 including such holes on the portion of the bar 472 adjacent such holes provides a firm grip thereon.

A towbar 630 comprising a rigid plate 631, a left J-shaped hook 633 and a right J-shaped hook 232 is used to draw the pallet 450 into chamber 430 and upwards of trailer bed 574. The towbar hook 633 releasably yet firmly engages bar 472 between end plates 467A and 466A and hook 632 releasably yet firmly engages bar 472 between end plates 467B and 466B, as shown in FIG. 13, where an operator's hand 500A is shown supporting such towbar; the plate 631 is a rigid steel plate with an eye 634 therein for attachment to cable as 568 and 442.

In operation wheels 425 and wheel support means therefor operatively attached to the walls 432 and 433 are adjusted for movement of assembly 421 about the area at which cotton is harvested and drawn to such areas by the tractor as 424. A towbar 630 is then attached to drawbar 472 and cable 442. The winch 441 is then actuated by an operator as 500 to draw the pallet 450 into the container chamber 430 and locate it between the walls 431-4 of chamber 430, as shown in FIG. 4. The upper pallet surface is then normal to the vertical path of the plunger 436. The plunger assembly 422 is also movable from front to rear (and vice versa) of chamber 430 and relative to the pallet so that the plunger 436 can act on different portions of the material as 578 added to chamber 430, as shown in FIG. 1 and then supported on different portions of the pallet 450 to even out and compress different portions of such masses supported on that pallet.

On addition of the mass of harvested cotton 578 from harvester 50 to the container chamber 430, the plunger assembly 422 is controlled by the operator 500 to drive the plunger head 436 thereof against the top mass of cotton (as in FIG. 20) above the pallet 450 and so form a mass of uniformly compressed cotton 597 of 12 to 14 pounds per cubic foot density.

The tarpaulin 592 is applied to the top surface of mass 597 to cover that mass above the pallet and protects it from rain while the continuous water impermeable surface 455 of the pallet 450 prevents moisture from entering the base of such mass 597 on the loaded pallet. The container walls 431-434 are then raised upward of the mass of cotton 597 within the container chamber 430 as by the wheel support assembly 427 as in U.S. Pat. No. 3,749,003 or other patents, as U.S. Pat. No. 2,782,586, wherein a mobile press is used, and the rear door 434 removed or raised. The mobile press is then moved away from the pallet 450 thereby leaving the cotton on the pallet 450. The cables as 591 are earlier passed through the grommets as 593 for rapid attachment to the plate edges 448 and 449.

Ell-shaped steel bars 448 and 449 are firmly attached to sheet 55 at its edges 473 and 474 and provide seating of points 641 and arms as 442 for each of hooks as 481, 482, 483, 484 and 595 on the right side and like hooks as 595 on the left side of assembly 590. Each of these hooks as 595 is formed of a J-shaped hook and a circular loop or eye. The hook is formed of an arm 642, with a bend 643 and a shaft 645 connected to the eye 644. The end 641 of arm 642 engages the side of the L-shaped side member 448 and eye 644 holds a length of rope as 591 on the other end of hook 595. The tarpaulin 592 has the eyes of grommets as 593 thereof joined to the lengths of rope 591 and weights 598 and 599 provide for a resilient tensioning of the thus covered assembly 590.

The pallet 450 thus loaded is moved up a ramp 574 of the transporter-loader assembly 570 for transport to a gin whereat the cotton added to the container chamber 430 (by a harvester as 550, as shown in FIG. 1) is to be treated. The loaded pallet is moved down the ramp at the gin and, after some storage at the gin, the loaded assembly 590 with the pallet 450 is again moved up another ramp as 574 to another treating platform as 434 at the gin. Following the removal of the cotton from the pallet 450, each pallet as 450 is stacked and, following such stacking, is returned to the grower for further use in the process of forming loaded pallet assemblies as 590, shown in FIG. 1, as herein described in relation to the action shown in FIGS. 1, 2 and 20. Accordingly, each pallet as 450 is subjected to several dragging motions in each full cycle of use thereof.

The drawbar 472 of the pallet 450 provides for applying a uniform longitudinal stress to the runners 451-4 by cable 568 of trailer 571. These longitudinal runners are flexible upwardly, i.e., transversely to the length of such runners, to provide for movement of the loaded pallet up the loading trailer 570 without damage to the cotton mass as well as to the pallet due to such repeated flexing. The pallet 450 bottom surface is straight, as viewed transversely to its direction of movement, when the combination of module and cotton thereon is drawn to the ramp 574 because the drawbar 472 is rigid and firmly draws on the runner members 451, 452, 453 and 454 and the corrugations of the sheet 455 provide rigidity against bowing or bending about a vertical axis transverse to the direction of movement of the mass 597. The corrugations also serve to engage with the mass of cotton 597 pressed thereon, and so assists in movement of the mass up the ramp. The engagement of the mass 597 with the corrugations also provides for stability of such mass 597 of assembly 590 during its transport, after loading as in FIG. 19E, from the ground surface 552 of the field from which such seed cotton 597 is harvested to the gin, where such seed cotton is to be treated.

The runners 451-454 distribute the longitudinal stress of drawing the mass 597 up the ramp of the transport and loading apparatus 570 from the bar 472 to the separate portions of the sheet 455 without sheet 455 bearing any substantial longitudinal stress. Due to the transmission of such lengthwise or longitudinal stress along the runners 451-454 and the method of attachment of such runners to sheet 455 in pallet 450, pallet 450 provides for ready and controlled binding of each of its increments as the mass of the loaded pallet assembly 590 is drawn upwards of the transport loading apparatus 570.

More particularly, the sloped side walls 461 and 463 of each runner as 451 are able to bend laterally from positions shown in FIG. 17A to those shown in FIG. 18A so that while the lower wall, 462 (and 462A, 462B and 462C), of each of the runners as 451 (and 452-4) continues to bear the longitudinal stress from bar 472, each increment of the sheet 455 is evenly bent along its length, as shown in FIG. 18, without developing any such protrusions of mass 597 as would otherwise develop from concentration of stresses during loading of the loaded pallet assembly 590 on a transport assembly 570. Protrusions of portions of the seed cotton mass 597 beyond the side surfaces of the mass weakens the tarpaulin attachment of assembly 590 and causes loss of cotton in transport and promotes irregular driving of the mass on top of the pallet.

In the operation of drawing the pallet into the transport, the uniformly transversely bent and grooved surface of sheet 455 and its mode of attachment to the runners 451-4 provide for smooth flexure of all of the corresponding increments of length of sheet 455 as the loaded pallet assembly 590 is moved from the ground 552 onto the sloped loading platform 574, as shown in FIGS. 3 and 18 and 19A-D, as well as similar flexure when the pallet is moved from the transport loader to the ground.

FIGS. 19A-19E diagrammatically illustrate stages in the operation provided by the pallet 450 in the system 421. As diagrammatically shown in FIGS. 19A-19E, the shape of the mass of seed cotton 597 on the pallet 450 changes while the loaded pallet assembly 590 is drawn up the ramp bed 571.

Figure 19A:
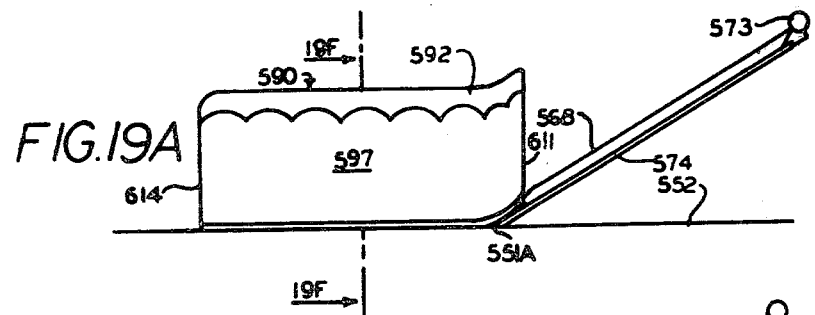
FIGS. 19A-E are diagrammatic side views of loaded pallet assembly 590 at different stages of movement thereof from ground to tilt bed trailer.

At the beginning of the loading operation, as shown in FIG. 1, the front portion of the mass of seed cotton 597 essentially has a vertical front surface 611, a vertical rear surface 614, a horizontal top front surface 612, a horizontal rear surface 613, a horizontal bottom rear surface 615 and a horizontal front bottom surface 616. On initial movement of the mass 597 up the ramp 574, as shown in FIG. 19A, toward position shown in FIG. 3, the portion 626 of the mass 597 bounded by the small upwardly tilted surface portions 612 and 616 immediately to the rear of front surface 611 forms a thin parallelepipedal mass 626 with the remainder 627 of the mass 597 defined by the surfaces 612, 613, 614 and 615 substantially in the same orientation as when assembly 590 was stationary and resting on the ground, generally as shown at the left side of FIG. 1.

Figure 19B:
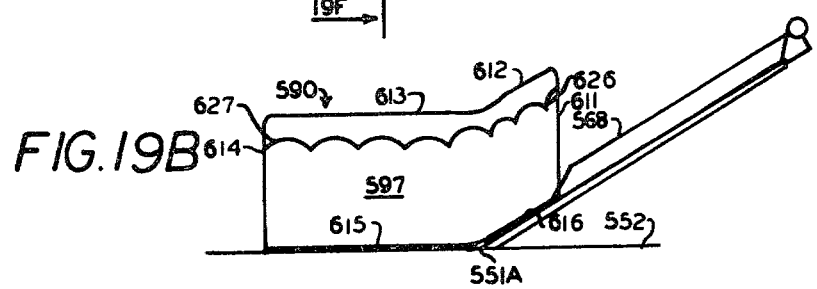

As more of mass 597 is drawn up the ramp 571 by the cable 568, the parallelepiped mass 626 to the front of the junction of of the rear end 575 of trailerbed 570 and the ground 552 (i.e., at angle 547 or 551) increases in length. The mass 627 to the rear of apex of angle 551 does not have its shape changed during the initial movement of the mass 597 up the ramp 571 so long as the mass 627 to the rear of plane 618 is very large relative to, and much larger than the mass 626 (which mass 626 is located forward of apex of angle 551) because of the ready deformability of the mass 597 of seed cotton mass 626 is (as shown in FIGS. 19A and 19B) distorted to a parallelepiped shape; therefore, the front surface 611 remains parallel to the position of that surface (611) in its rest position (shown in FIG. 1) for that surface. However, by the time, in the process illustrated, a sufficient portion of the mass 597 has been moved up the ramp 574 so that the length of horizontal surface portion 613 and tilted surface portions 612 (along the top of the mass 597) are about equal, the front surface 611 of the mass 597 has an angular position—shown in FIG. 19C—relative to the upper surface of bed 571 of trailer 570 that is, generally, almost perpendicular thereto; such angular position of surface 611 is between (a) the angular relation of surface 611 to the ground 552 at the rest position of the mass 597, as shown in FIG. 1 (where it is, i.e. substantially perpendicular to the ground); and (b) the vertical position (shown in solid lines in FIGS. 19A and 19B and in FIG. 19C in dotted line 611A).

Figure 19C:
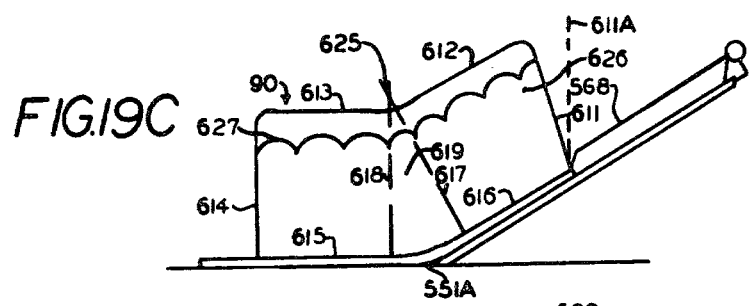
Figure 19D:
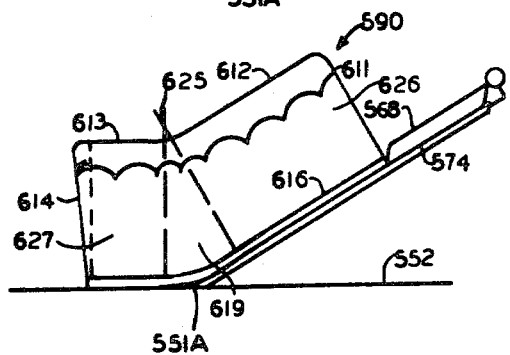
Figure 19E:
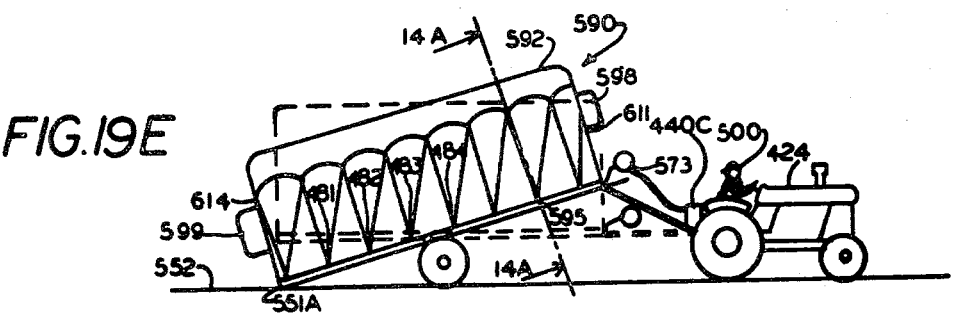

Initially, in the sequence of operations shown in FIGS. 19A to 19E, the rear surface 614 of the mass 597 of assembly 590 is in the same angular position relative to the ground surface 552 as it was in the rest position of FIG. 1, but, as the mass 590 moves from left to right, as shown in FIGS. 19A–19E (note that the position of apex 551A of angle 551 is stationary), the length and size and weight of mass 626 (to the front of apex of angle 551) exceeds the length and size and weight of mass 627 and surface 614 becomes more parallel to surface 611, as shown in FIG. 19D and in full lines in FIGS. 19E (tilted counterclockwise).

FIG. 19E shows in full lines the assembly 590 fully supported on the tilted bed of the trailer 570 while the thus loaded trailer 570 is shown in dotted lines in position for being drawn by tractor 424 and being drawn thereby.

During this procedure of change in orientation of surfaces 611 and 614, there is a substantial period of time wherein a zone 619 composed of mass of seed cotton of shape of a trienated circular sector or wedge and bounded by surfaces 618 and 617 in FIGS. 19C and 19D is formed above apex of angle 551.

Mass 619 is formed concurrently with the change in shape of mass 597 from a shape symmetrical about a central vertical plane 19F (shown in FIG. 19A) as in FIG. 1 (wherein the top [including portions 612 and 613] is straight as is the bottom surface) and the seed cotton therein is evenly compressed to an asymetric shape as in FIG. 19C, which develops compression between adjacent zones of volumes 626 and 627 immediately below surface portions 612 and 613. The pallet 450 above the apex of angle 551 however, is sufficiently strong although flexible to support the portion of the mass 619 thereabove sufficiently firmly to urge the seed cotton mass above such curved pallet portion upwards so that projection of a first plane 617 perpendicular to the surface of the bed 571 whereat the bottom surfaces of the pallet runners 451-4 are spaced away from the surface of the bed 571 and the projection of a second plane 618 perpendicular to the surface of the ground 552 whereat the bottom edge of pallet runners 451-4 are spaced away from the surface of ground 552 meet at a line 624 which is located substantially above the intersection of top surface 612 and 613 of the mass 597 as shown in FIGS. 19C and 19D, usually at least one-third of the height (surface 615 to 613) of mass 597 above the top of mass 597 measured at the line—at apex 551A of angle 551—whereat the plane of the bed 571 meets the surface 552. Thereby the compression of the mass of seed cotton immediately below the top of surface 612 and 613 and above the line (551A) whereat the plane of the trailer bed 571 meets the surface of ground 552 is so reduced that no lateral or horizontal extrusion of that mass 597 occurs.

A part of this upwardly urging action by the curved portion of the pallet 450 is due to the engagement of the bottom of mass 597 and the corrugated surface of sheet 455; such engagement serves to fix the ends of any and each curved portion of runner as 451-4 as each such portion, as shown in FIG. 18, extends between ground 552 and surface of bed 574 while the loaded pallet assembly is drawn up the sloped bed past apex 551A of angle 551. This action of the runners and surface 455 to be bendable at bottom of zone 619 yet extremely strong to provide only a small angle between planes 617 and 618 as measured at their junction at line 625 is due to the limited but definite bowing of the side walls as 461 and 463 permitted by the lack of connection of the top edges of those side walls to each other except at spaced apart connections, as 560 and 561, to sheet 455; while such permitted bowing, as shown in FIG. 18A, results in bending of the runners between such points sufficient to form a small curve, as shown in FIG. 18, which is permitted by ready compression of plate 455 parallel to length of edges 501 and 502 of sheet 455 while each runner as 451 bows outwardly as shown in difference in shape of sections in FIGS. 17A and 18A. The bending of each runner as 451 beyond such predetermined initial amount is vigorously resisted by the resistance to any further lateral displacement (parallel to edge 503 of plate 455) of portions of flanges 464 and 465 attached to sheet 455. Such control of displacement provides the flexibility yet strength needed to provide the limitation to development of compression on upper portion of seed cotton mass 597 such limitation of compression in mass 597 preserves the stability of such loaded pallet assembly 590 that would otherwise be lost in loading it on transport 570 notwithstanding the care taken to develop such even compression and stability in assembly 421. As the mass of seed cotton 597 has substantially no tensile strength, once extruded, because of the development of such compressive stress, such seed cotton mass would, absent such action of the deformable pallet 450 as provided herewith for loading on a transport as 570 be left with irregularities at the sides of the mass and the loosening of the tarpaulin at its top.

While the above discussed compressive relations in mass 597 are shown as occuring in FIG. 19C at the middle of the mass 597 during the drawing of loaded pallet assembly 590 up the ramp 571, the procedure of relieving of stress at the top of the truncated wedge portion as 619 formed between relatively dimensionally stable masses of compressible material as shown in FIGS. 19C and 19D, occurs also in the mass 627 to the rear of the position of zone 619 in FIGS. 19C and 19D. The above discussion of relief of potential compressive stress at top of zone 619 in mass 597 by the above described action of the pallet 450 occurs at those portions of mass 597 to the rear (toward surface 414 as well as at portions of mass 597 to the front (towards surface 611 of portion of pallet assembly 590 relative to apex 551A shown in FIG. 19C, as the flexibility and limited distortion of the pallet 450 provides for relief of stress in the upper portions of the cotton module mass as would otherwise cause irregularities in its outer surface resulting from high degrees of compression. Such relief is effected by the pallet 450 for the mass 597 in the zone extending from one-fourth of distance from the rear surface 614 to the front surface 611 of the mass 597 to three-fourths of that distance and transport of the loaded pallet 590 on the trailer 570 as shown in FIG. 19E, occurs without loss of cotton by being carried away by the wind during transport due to irregular side surfaces.

The top surface 574 of the bed 571 supports the loaded pallet assembly 590 after such assembly is drawn on the trailer bed. During transport on trailer 570 the bars 472 and 474 of pallet 450 provided attachment to ropes or chains to firmly attach the loaded pallet assembly 590 to the tie downs as 579 on 579' for the trailer bed hooks.

Unloading of the loaded pallet 490 is accomplished from trailer 570 without undue compression and sideways seed cotton extrusion development in the same manner as loading onto trailer 170 is accomplished without such undue compression as produces seed cotton extrusion during loading as above described for the loading of the pallet assembly 590 Accordingly, storage of the loaded pallet 590 at the gin yard after discharge of the loaded pallet assembly from the trailer 570 is accomplished without development of any irregularities in the surface as would (otherwise) provide for undesirable and excessive drying in selective points of the mass 597.

After transport thereon to the gin yard, assembly 590 has sufficient dimensional stability to be discharged from trailer to ground to await later transport to the gin while maintaining a high and substantially uniform bulk density for later transport to and rapid handling at the gin.

After removal of the mass 597 and tarpaulin 592 at the gin, the pallets are very readily handled and nested for return to field for later use, as above described. The pallets 450 are each sufficiently light for ready manual handling (of one at a time) by only two operators holding bars 472 and 474 whereby the bottom of one pallet is readily placed adjacent the top surface of another to form a readily transported nest of such pallets, as pallet 450 herein described weighs 400 pounds.

Figure 16:
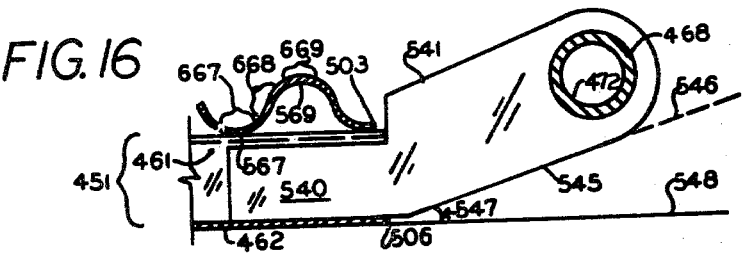
FIG. 16 is a sectional view of front end of runner 451 as seen along plane 16A—16A of FIG. 15 in zone 16B of FIG. 13.

The location of center of bar 472 is, as shown in FIG. 16—which FIGURE is drawn to scale—in line with top of plate 455 so that drawing of the pallet 450 along the bed surface 574 by cable 568 does not cause bending of the mass 597 as would increase compressive stress in the upper portions of the mass 597 after the bottom walls as 462-462C of each runner as 451-454 is located on the surface 574 of bed 571.

The cables 591 on the loaded pallet assembly 590, in the position shown in FIG. 1, which position is a position of such assembly while in the field on the ground surface 552 on which such loaded pallet assembly 590 is formed in the mobile press assembly 421, as above described, permits that the cables attached to the grommets and the tarpaulin above the mass 497 may move within the eyes as 644 of the hooks as 595 (and 418-4) of the loaded pallet assembly 590 while held in tension by the weights 598 and 599. The hooks 595, with the eye 644 thereof, also permits that the cables will permit movement of the tarpaulin 592 on top of the mass 597 when the mass 597 changes its shape as hereinabove described and shown in FIGS. 19A-19E during the process of movement of that mass 597 from its position on the ground surface 552 onto the inclined bed 574 of the trailer 570 when such longitudinally continuous mass of seed cotton 597 is moved from its position as shown in FIG. 1 through the stages shown in FIGS. 19A-19E. During such movement as shown in FIGS. 19A-19E, the top surface of the longitudinally continuous mass of seed cotton 597 provides an upwardly concave surface at the juncture of surfaces 612 and 613 of mass 597 as well as a downwardly convex surface above apex 515A of angle 551 where the lower portion of the wedge-shaped or truncated sector-shaped portion 619 contacts the top of the curved portion of the pallet 450 which curved portion is shown particularly in FIG. 18. Accordingly, the cables as 591 permit the distance from tarpaulin grommet to pallet hook eye as 644 to increase against the resiliently yieldable tension of cables 591 and 591' and movable weights 598 and 599 because those cables move freely through the hook eyes as 644 and thereby provide that the tarpaulin 592 be held to the support or pallet 450 by such cables 591 peripherally of the mass 597 in a resilient manner. The structure also permits that as the stress on one front set of cables adjacent the front surface 611 is increased consecutive increments of the longitudinally continuous mass 597 and the tarpaulin 592 thereover will cause the temporary elongation of some of the cables between the grommets of the tarpaulin and the eyes of the hooks connected to the L-shaped edge pieces 448 and 449 on the pallet 450. The ready removability of the hooks permits that operators may locate those hooks as needed and that during the stacking operations of such pallets for return of those pallets to the field at which their use is intended such stacking does not suffer interference because of interference by the hooks or loss and/or bending of such hooks. This structure also permits that the tarpaulin may be prepared for later use by unrolling over the mass 597 as shown in FIG. 2) with the cables as 591 attached to the hooks as 595 by such cable passing through the eyes as 644 of each of such hooks and the hooks subsequently drawn down over the sides of mass 597 with the hooks attached thereto and said hooks then attached by arm end 241 hooking into an ell as 448 and 449 for the proper positioning of those cables and hooks onto the pallet 450. After the positioning of such hooks and cables, the weights 598 and 599 are applied to the cables as shown in FIGS. 1, 3 and 19E with the hooks then properly attached to the pallet 450, as shown in FIG. 14. The cables then firmly yet releasably draw the water-impermeable tarpaulin cover to the top of the mass 597. Such attachment also permits that the mass 597 can expand due to change in moisture content of the seed cotton and to relief of the pressure in said seed cotton mass; such expansion of the distance between the grommets of the tarpaulin and the fixed position of the hooks as 585 to the L-shaped side members as 448 and 449 of the pallet 450 is accommodated by that the eyes as 644 of each of the hooks as 595 permit the cable 591 to slide therethrough while bend 643 holds to the edge members as 448 and 449 of the pallet 450. The ability of these cables and hooks to accommodate changes in the distance of the grommets as 593 to the ells on the pallet 450 also provides that, during change of dimension of the portions of the tarpaulin on top of the longitudinally continuous mass 597 during the movement of that mass 597 from its position in the field 552 up the surface 574 of the inclined bed 571 of the trailer 570 that the resulting tension developed on the grommets of the tarpaulin will not rise to such value as will cause a compression of the cotton immediately under the tarpaulin or rupture the tarpaulin or produce extrusion of the seed cotton mass from the sides of the mass 597 nevertheless, the cables, grommets and weight provide a firm attachment of the tarpaulin to the mass 597 by virtue of the tension along all of the cables as 591 through the eyes as 644 of the separate hooks as 481, 483, 484 and 595 on each side of the mass 597 due to the effect of the weights 598 and 599 at the end of each of such cables. Cable 591 extends along the right side of the mass 597 cable 591' extends on the left side of mass 597 from weight (tire) 598 to 599.

In the preferred embodiment of pallet 450, for each runner as 451, the flange 465 is one (1) inch total width (from the lateral edge to the plane of wall 463); the wall 463 is 1½ inches high (from top of flange 465 to bottom of wall 462) and base wall 462 is four (4) inches wide (from plane of outside of walls 461 to 463. These measurements are, accordingly, taken to include the curved portions attached thereto. Runners 451-4 are each made of 1/20 inch thick (18 gauge) steel sheet for pallet 450 above described (24 feet long, 7 feet 6 inches wide size). Plate 466 is 10 gauge.

Each hole as 468 in each plate as 466 is 1¼ inches in diameter and each plate as 540 is 4 inches long (from edge 506 of sheet 462 and 1¼ inches wide; plate 541 is 5¾ inches long and 1¾ inches wide adjacent to edge 506 of sheet 462 and 2¼ inches wide at the center of hole 468. Angle 547 is 17°.

The hook 595 is 2½ inches long measured from tip of eye 644 to end of arm 643; eye 644 has ½ inch internal diameter and there is 5/16 inch space between arm 642 and shaft 654; each hook as 595 is formed of 7/64 inch diameter mild steel rod and is resilient. Hook end 641 extends 1 inch from the right hand side of the bend 643, as shown in FIG. 12, and is 1½ inches from a line drawn vertically from the left hand side of the eye 244.

Further dimensions and curvatures may be obtained from FIG. 12 which is drawn to scale.

Pallet 650

The pallet 650 comprises an imperforate water impermeable transversely grooved surface formed of a thin corrugated imperforate steel sheet 655 like 455 and a plurality of parallel longitudinally extending runners 651, 652, 653 and 654. Runners 652 and 653 are alike but are different in structure from runners 651 and 654 which are alike only to each other. Sheet 655 and runners 651-654 joined as above described for joining of sheet 455 and runners 451-4 and drawbars as 472 and 474 are similarly held in holes as 468 and 469 in runners 651-654.

Each runner as 652 is composed of a left vertically (1½ inch) extending yet inwardly (¼ inch) sloped (about 10°) left side wall 661, a bottom flat smooth horizontal sheet 662 (4 inches wide), a right (1½ inch) vertically extending outwardly (¼ inch total) sloped (about 10°) side wall 663, a top left flange 664 (1 inch wide), a top right (1 inch wide) flange 665 a left (⅜ inch wide) flange rib 666 and a right (⅜ inch wide) flange rib 667; a rounded front left end plate as 466 a rear left end plate as 476 joined to wall 661 as plates 466 and 476 are joined to wall 461 and a front right end plate as 467, a rear right end plate as 477 joined to wall 662 as plates 467 and 477 are joined to wall 463. The left side wall 661 and the right side wall 663 are firmly yet resiliently joined at softly rounded (3/16 inch radius) corners as 661R and 663R along the total length of their bottom edges to the total length of the left edge and right edges, respectively, of the bottom sheet 662. The upper end of each of sides 663 and 661 are joined by corresponding soft rounded corners 264R and 265R to flanges 664 and 665, respectively. The left flange rib 666 and right flange rib 667 extend downwardly and slope at 45° to horizontal, for ⅜ inch as in FIG. 17B, and are firmly yet resiliently joined at rounded corners as 666R and 667R along the total length of their central edges to the total length of the left and right (outer) edges of the flanges 664 and 665, respectively. The ribs 666 and 667 serve to stiffen the flanges 664 and 665. The walls and sheets 661, 662, 663, flanges 664 and 665 and ribs 666 and 667 are formed of thin medium carbon sheet steel 0.05 inch thick (18 gauge) like runners 451-4 resilient yet springy and formed by cold forming a plate of such material.

Parts of runner 653 corresponding to like parts (as 662) of runner 652 are indicated by the same referent number with the letter A (e.g., 662A), as shown in FIG. 17B.

Each runner as 651 is composed of a left vertically (1½ inch) extending yet inwardly (¼ inch) sloped (about 10°) left side wall 761 a bottom flat smooth horizontal sheet 762 (4 inches wide), a right (1½ inch) vertically extending outwardly (¼ inch total) sloped (about 10°) side wall 763 a top left flange 364 (1 inch wide), a top right or lateral flange 765 a outer flange rib 767 and a inner (⅜ inch wide) flange rib 766 a rounded front left end plate as 466 and rear left end plate as 476 joined to side wall 761 as plates 466 and 476 are joined to wall 461 and a front right end plate as 467 and rear right end plate as 477 joined to side wall 763 as plates 467 and 477 are joined to wall 763 (as in runners 652 and 653). However, in runners 651 and 654, the outer flange rib 767 extends upwardly (⅞ inches) from flange 765 and is located at lateral edge of plate 655 and is firmly yet resiliently joined at corners as 765R along the total length of the outer edge of (2¾ inch wide) flange 765 the inner left flange rib 766 extends downwardly and inwardly from flange 764.

The left side wall 761 and the right side wall 763 are firmly yet resiliently joined at softly rounded (3/16 inch radius) corners as 761R and 763R along the total length of their bottom edges to the total length of the left edge and right edges, respectively, of the bottom sheet 762. The upper end of each of sides 761 and 763 are joined by corresponding soft rounded corners 764R and 765R to flanges 764 and 765, respectively. The flange rib 766 extends downwardly and inwardly at 45° to horizontal, as shown in FIG. 17B, and is firmly yet resiliently joined at rounded corner 766R along the total length of its central edge to the total length of the left edge of the flange 764. The ribs 767 and 766 serve to stiffen the flanges 765 and 764 respectively. The joining of the runners to the sheet 655 is at the same spacing as above described for pallet 450 the stiffening effect of the rib flanges produces a greater strength than does the runner structure of pallet 450 and similarly prevents undesired compression of the cotton module mass as 597 supported on such a pallet loaded as above described for pallet 450 in a loaded pallet assembly as 590; holes as 790 regularly spaced along flanges 765 and 765A provide location for hooks as 595 and such hooks locate cables as 591' (same as 591) as above described for assembly 590. Parts of runner 653 corresponding to like parts (as 662) of runner 652 are indicated by the same referent number with the letter A (e.g., 662A), as shown in FIG. 17B.

The Module Treating Assembly 30

The apparatus 30 comprises a frame assembly 150, a feeder assembly 31, a disrupter assembly 41 and a separator assembly 51 in operative combination. The apparatus 30 is directed to be used with the pallet 450 as a part of a system for handling and transporting seed cotton as in FIG. 20.

The frame 150 has a hooded end frame 151 portion and an open topped feeder assembly frame portion 152.

The feeder assembly frame 152 comprises left and right longitudinal members 153 and 154 firmly joined to transverse rigid members 155, 156, 157 and is provided with vertically extending feet 211-219 on its left side and, similarly, on the right side. Vertical rigid feeder assembly left side wall 32 and rear wall 33 are flat on the inside and firmly attached to each other and the frame 152 while a pivotal door assembly 34 is pivotally attached onto a left longitudinal side member 158. A conveyor assembly 37 comprising drive rolls 145, take up roll 146 and a belt 147 and a drive motor 148 is operatively attached to and supported on the frame 152, with that motor 148 operatively attached to the drive roll 145. Member 158 is a rigid and parallel to and above and firmly supported on side member 153.

Figure 26:
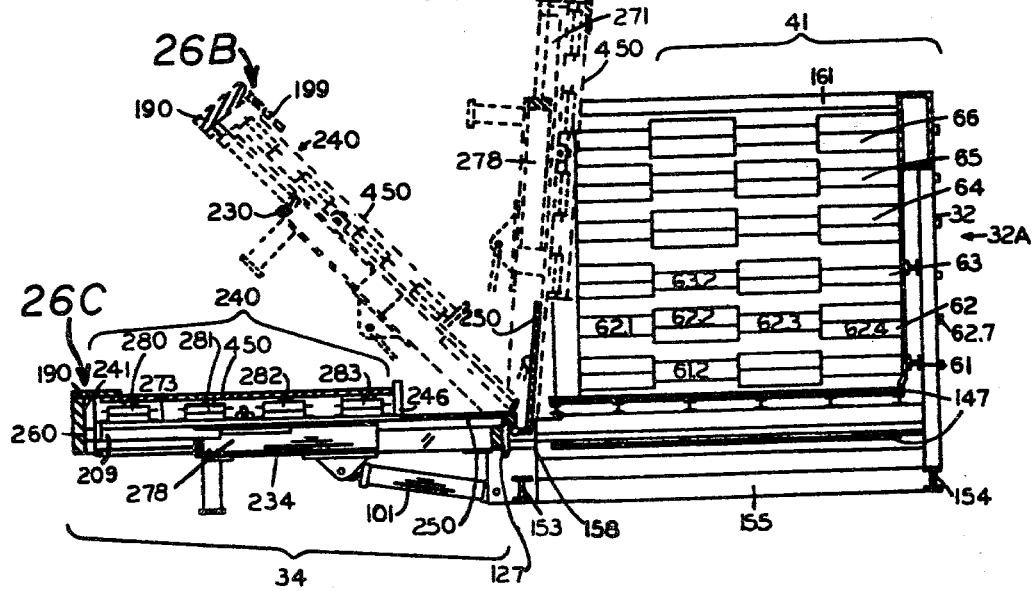
FIG. 26 shows consecutive steps in the movement of the lift door assembly 34 from the position of FIG. 25C to its return for receiving another load and the disrupter assembly 41 as seen along section 26AA—26AA but without module present. The dashed line portion 26A shows the door retained apron vertical and the lift door assembly in extended position preparatory to return for receiving added modules and also shows the allowance for positioning of retained apron; the dashed line portion 26B shows the lift door assembly in tilted position following movement from position shown as 26A and during return to extended horizontal position of portion 26C.

The feeder assembly thereby forms an open-topped enclosure 38, with the door assembly 34 pivotally attached thereto. The enclosure 38 encloses a feeder assembly chamber 39. The conveyor belt 147 is located on the bottom of the chamber 39 and extends below the bottom edge of side wall 32 and rear wall 33 and the apron of the door assembly 34 and, at its front end, below the disrupter assembly 41, as shown in FIGS. 23 and 26.

A hood 160 is composed of a top wall 161, a left side wall 163, a right side wall 162, and a front end wall 164, enclosing an end chamber 165. Walls 162, 163 and 164 are firmly joined to each other and to the frame portion 151.

Figure 25:
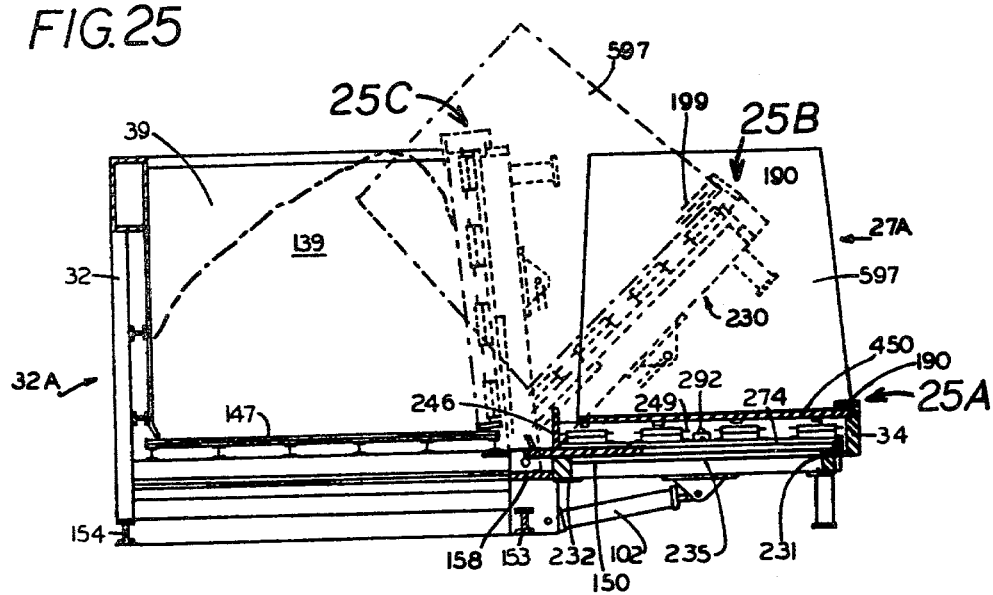
FIG. 25 is a set of transverse sectional views along the plane 25AA—25AA of FIG. 22 to show sequential stages in the transfer of a pallet and module from the door assembly 34 into the feeder assembly chamber 39. The full line portion thereof shown as 25A shows the lift door assembly 34 and module in retracted position preparatory to lift. Portion 25B in dashed lines shows the lift door assembly and module thereon in elevated position during transfer of the module to chamber 39, and portion 25C of FIG. 25 shows the lift door assembly in retracted position and maximum lift and the module in the chamber 39 and the pallet held on assembly 34.

The right side wall 162 of the hood 160 is coplanar with the fixed right side wall 32 of the feeder assembly 31. A disrupter assembly is located in and is supported on the side walls of the hood 160 and the left side wall 163 is coplanar with the interior of the pivotal door assembly 34 when such assembly 34 is in its closed position, as shown in FIG. 25 (part C).

The feeder assembly walls and conveyor 37 are firmly supported above the ground by vertically extending rigid frame feet (211-219) on the left side and like sturdy feet on the right side whereby the conveyor is at the level of the top of the transport trailer as 132 for the module as 133 as hereinbelow described.

The disrupter or dispersing assembly 41 comprises a drive motor 40 and a reel unit subassembly 60. The reel subassembly comprises a plurality of generally alike horizontally extending reel subassemblies 61-66. Each of the reels as 62 of the subassembly 61-66 comprises a longitudinally arranged series of like reel units as 62.1, 62.2, 62.3, 62.4, on a horizontal rigid shaft 62.5 and driven by pulley wheels 62.6 and 62.7, such pulley wheels firmly attached to the end of the shaft 62.5. Alternate units as 62.1 and 62.3 are identical in orientation while alternate units as 62.2 and 62.4, while identical in structure, are oriented perpendicularly relative to the shaft on which the neighboring units as 62.1, 62.3 are located; i.e., horizontally adjacent units 62.1 and 62.2 are rotated 90° with respect to each other, generally as shown in FIGS. 24 and 30. Each of the units vertically adjacent as is 62.1, 61.1 and 63.1 are rotated 90° relative to each other about their shafts 62.5, 61.5 and 63.5, as shown in FIGS. 24 and 30, whereby to provide across the front end of the cotton module fed toward the head end of apparatus 30, a uniform thrashing action and a uniform orifice area through such assembly to the separator assembly space 50 in the hood 160.

Each unit as 62.2 comprises a pair of circular pltes as 46 and 47 each firmly attached to the shaft therefor as 62.5. Eight rod holes as 181-188 are equispaced on the plate 46 and eight like rod holes 191-195 are equispaced in plate 47 with finger support rods 201, 203, 205 and 207 supported by plate 46 in holes 181, 183, 185 and 187 and also in corresponding holes in plate 47 respectively; each of rods as 201 and 203 having their central longitudinal axes parallel to the shaft 62.5. Rods 201, 203, 205 and 207 are rigid cylindrical rods. Rigid plates 174, 175, 176 (and 177 not shown) are attached to the shaft 62.5 and also, at their ends, to plates 46 and 47, generally as shown in FIG. 4. Six equispaced steel teeth 174.1-174.6 are attached to each of alternate plates 174 and 177 and 5 equispaced teeth as 175.1-175.5 are firmly attached to each of plates 175 and 176. On each rod as 201, sleeves as 220-224 provide for maintaining spacing of the teeth. Each of the teeth, as 175.5 has a base as 73 held in a hole in plate as 175, a loop 74 around the bar as 201, a radially extending portion 75 and a terminal portion or point 76. Such teeth are made of one-quarter inch resilient steel rod. The teeth of each such unit on any one plate (as 175.1-175.5) pass through the spaces defined by the length of the teeth of the unit therebelow and thereabove, as shown in FIGS. 24, 30, and 31.

In the embodiment of reel units as 62.2 illustrated in FIG. 4, the plates 174, 175 and 176 and 177 (177 is not shown but is like 175) are all like flat rigid radially extending plates with holes therein as 72 for engaging and holding the base, as 73, of each of the teeth held therein, as shown for 175.5 in FIG. 24.

In the embodiment of reel unit as 62.2 shown in FIGS. 30 and 31, each unit as 52.2 comprises a pair of plates as 46 and 47, rods as 201-204, sleeves as 220-225 and 821-824 and teeth as 175.1-175.5 and a supporting hollow shaft as 862.5, functioning, supported, and driven like shaft 62.5. Each plate as 46 and 47 in embodiment of FIG. 30 is firmly attached to a horizontal rigid steel support pipe 862.5 (3½ inches diameter, shedule 80 pipe, 9 ft. 10 in. long in the preferred embodiment). Rod holes as 181-188 are equispaced radially and circumferentially as shown in FIG. 31 in the plate 46 in embodiments of FIGS. 24 and 30, with like rod holes as 191-198 (only 191-195 are shown) in the plate 47. Plates 46 and 47 and finger support rods 201-207 are the same in embodiments of FIGS. 24 and 30.

In the embodiment of reel units as 62.2 illustrated in FIGS. 30 and 31, rigid steel bars 874, 875, 876 and 877 each ½ inch×1 in. in transverse cross-section extend between plates as 46 and 47 and are firmly attached to and supported on the rigid shaft 862.5. Such bars 874, 875, 876, and 877 are replacements for plates 74, 75, 76 and 77 in embodiment of FIG. 24. Bars 874-878 are firmly attached to their ends to plates 46 and 47 as shown in FIGS. 30 and 31.

In the embodiment of FIG. 30, steel teeth as 874.1, like teeth 174.1-174.6 are attached to each of rods as 203 and 207 and holes in bars as 874 and 877 and five equispaced teeth as 875.1-875.5 are firmly attached to each of rods 201 and 205 and to holes in bars 875 and 876. On each rod as 201-205 of each reel unit of assembly 60 as 61.1, 62.1, 62.2, 63.2, 62.3 and 62.4 in embodiment of FIGS. 24 and 30, sleeves as 220-225 on rods as 201 (with five teeth) and sleeves as 821-825 on rods as 203 (sith six teeth) maintain spacing of teeth on such rods. The teeth as 175.5 in embodiments of FIGS. 24 and 30 are the same. In the embodiment of FIG. 30, the base 73, as shown in FIG. 31 for tooth 175.5A (which is like tooth 175.5) is held in a hole as 872 in the bar as 875A (shown in FIG. 31) like 875 (and 874, 876 and 877) while the loop of such tooth passes around a rod as 201A (like rods 201 in FIGS. 24 and 30).

The separating assembly 51 comprises a horizontal conveyor belt 52 which acts as a receiving means from the disrupter assembly, an air fan 53, a vertical duct 54 with an inlet 55 adjacent the belt 52 and an outlet 54.6 at the upper end of the duct. The duct 54 extends vertically and is attached to the outside of the right side wall 162 of the hood 160. One discharge, 58, of the belt 52, goes to a collector 59 for collection of the trash separated out from the cotton fed to the chamber 39 while outlet 56 of fan 53 is directed by duct 57 to a container for collecting the treated cotton in a collector chamber 80 and passage to the gin 81.

A pivotal door assembly 34 comprises a pivotal frame assembly 230, a movable loading frame 240, a pivotal apron assembly 250 and a pallet clamp assembly 260.

Figure 27:
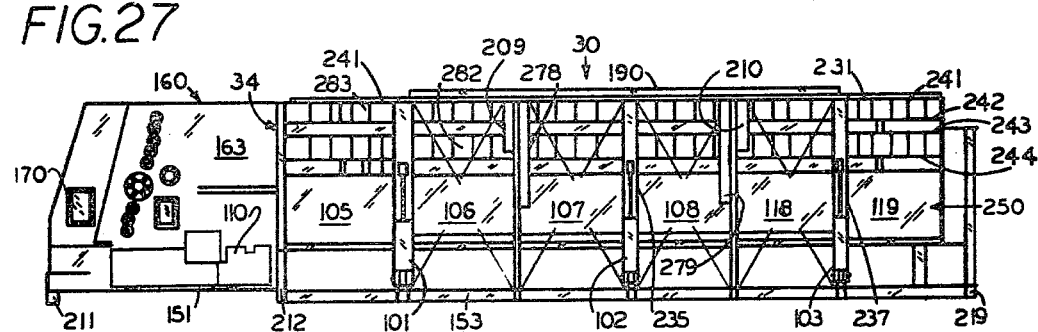

The pivotal door assembly 230 is a rigid frame comprising rigid longitudinal members as 231, 232 firmly joined to rigid main transverse members as 233, 235, 237 and auxiliary transverse members as 234, 236 and 238. Hydraulic pistons as 101, 102 and 103 are attached pivotally to the base of the frame of the feeder assembly and are attached to the transverse members as 233 and 235 and 237, generally as shown in FIGS. 25 and 26, for piston 101. The central end of each of members 233-237 is pivotally attached to the side frame member 158 of the feeder assembly frame 152. The pivotal frame transverse members 233, 235 and 237 are attached by hydraulic cylinders 101, 102 and 103 to the feet of the feeder assembly frame and appropriate controls as 110 are operatively connected to the cylinders 101-103 to move that door assembly from the horizontal position shown in Part A of FIG. 25 to the vertical position thereof shown in FIGS. 25 & 27 and also provide for the return of that door to the horizontal position, generally as shown in FIG. 26.

The movable loading frame 240 comprises a rigid longitudinal members 241-247 and rows of rollers, as 280-283, piston assemblies, as 278 and 279 and transverse members 271-277.

The transverse members are I-beams and are firmly joined to the longitudinal members. Rollers are supported in the four rows 280-283 for engagement with the runners of the pallet 450. A central slot 249 provides for a chain drag on the pallet to move that pallet along the movable loading frame from the trailer to the loading frame 240, as shown in FIG. 21, to locate the module of cotton 590 in the position shown in FIG. 22 abreast of the chamber 39 with the front edge of the module to the rear of the front edge of chamber 39 and the rear edge of the module 614 forward of the rear wall of the chamber 39 and the module cover 592 removed.

Figure 28:
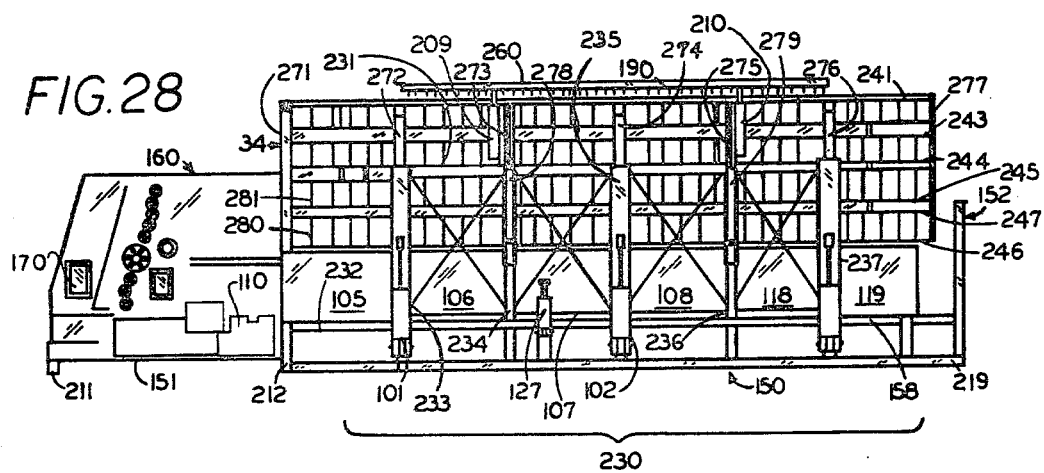
FIG. 28 is a side scale view of apparatus 30 in the same direction as for FIG. 27 but with the door assembly 34 in its extended position, as shown in portion 26A of FIG. 26.
Figure 29:
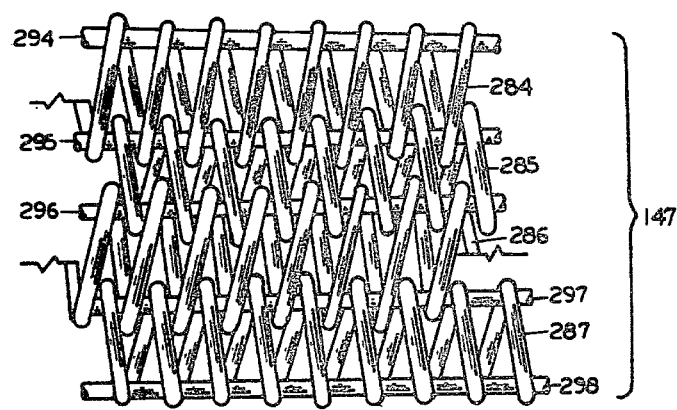
FIG. 29 is an enlarged plan view of a representative portion, 29A, shown in FIG. 21 of the conveyor belt 147.

The piston pair 278 and 279 extend between transverse members 273 and 275 of the movable loading frame and are also attached firmly to transverse members 234 and 236 of the pivotal frame 230 to extend the load frame, as shown in FIGS. 26 and 28 or to retract it relative to pivot frame 240. The transverse members 271-277 are I-beams and the slots in the apron assembly fit over the web of such I-beams to move along the length of such I-beams.

The apron assembly 250 comprises a rigid sheet 121 with spaced apart transversely extending slots 122, 123, 124, 125, 126 which slots separate that rigid sheet into solid imperforate portions as 105, 106, 107, 108, 118 and 119 separated by the slots 122-126. The slots loosely and slidably embrace the webs of the transverse members 272-276 of the movable frame 240 and allow the apron to be located between the top movable frame and the pivot frame, generally as shown in FIG. 25 in the contracted position of that door assembly 34 as shown in FIG. 25.

A powered link attached to the bottom of the apron, 127 in FIGS. 26 and 28, provides for holding the apron in vertical position after the pivotal door frame and the movable frame assembly have been moved to the horizontal position, as shown in FIG. 26, part C.

A horizontal movable rigid longitudinally extending clamp bar 190 with transversely extending teeth is attached to lateral member 241 of loading assembly 240 and acts as a clamp on the lateral side of the pallet 450 and its teeth which project horizontally and toward chamber 39 also hold that pallet 450 against the interior longitudinal member 246 of the movable frame 240 and thereby avoids dumping and pallet 450 into chamber 39 when the pallet and module are lifted and moved from position A shown in FIG. 25 to the position 25C in FIG. 25 and the module is loaded into chamber 39. The pallet grasping and releasing movement of that clamping bar 190 is controlled by hydraulic pistons 209, 210 each attached at its inner end to frame 240 and the clamping bar at their outer end.

Teeth 119 of clamp bar 190 of the clamp assembly 260 extend centrally (leftwards in FIG. 25, position A) into the mass 197 and over the left (as in FIG. 25, position A) lateral edge of the pallet 450 when the transversely movable loading frame is moved centrally from the position thereof shown in FIG. 21 and in FIG. 26, part C, to the position of the frame 240 shown in FIG. 25 part A. The clamp bar 190 is slidably yet firmly supported on the transversely extending members 272-276 of frame 240 and is operatively connected to one end of each of the hydraulic control pistons 209 and 210; the other end of each of pistons 209 and 210 is operatively connected to the movable frame 240. Each of the pistons 209 and 210 is connected to a source of hydraulic fluid and valve controls therefor at the control station 110 whereby (a) to move the clamp bar inward and thereby have its teeth engage the module 597 preparatory to lifting of that module as in FIG. 25 and (b) to move the clamp bar outward to release the pallet 450 after that pallet is emptied and returned to the position therefor shown in part C of FIG. 26.

The overall system for handling and transporting seed cotton comprises a mobile press assembly, a pallet and a tilt bed transport means and the preginning apparatus 30.

The mobile press assembly comprises a plunger subassembly and a container subassembly, said container subassembly comprising a plurality of vertically extending side walls, an end wall and a movable wall with a container chamber therebetween, said pallet at the bottom of said chamber and a winch attached to said vertical end wall, said plunger assembly comprising a vertically movable tamping subassembly, said plunger assembly comprising a rigid frame means, a vertically movable center post, means supported on said frame means to move said center post vertically and quietly, and side posts, one side post on each side of said vertically movable center post, the bottom end of said center post and said side posts attached to horizontal and longitudinal extending tamper plate and flexible tension means connected from the bottom of each of said side posts to the top of the other side post, each said flexible tensioning means being at its bottom parallel to one of said side posts and adjacent thereto at the bottom end of said one post and at its top parallel to and adjacent to the top of the other side post, whereby to equalize vertical movement at the bottom end of each end of said tamping plate, the pallet width and length completely closing the otherwise open bottom of said press assembly chamber.

The pallet of said system comprises an imperforate water-impermeable transversely grooved thin corrugated sheet and a plurality of parallel longitudinally extending like runners, each runner composed of a two like vertically extending outwardly sloped side walls and a bottom flat smooth horizontal sheet, the side walls firmly yet resiliently joined at corners along the total length of their bottom edges to the total length of the left edge and rigid edges, respectively, of the bottom sheet and extending upwardly therefrom, and said sheet is firmly connected to the top of said side walls at regularly longitudinally spaced apart points. The tilt bed trailer of the system comprises a winch and a bed, said winch attached to said bed, said trailer bed having a length at least the length of said pallet.

The minimum radius of curvature on the bottom of said mass of cotton on said pallet moved onto the said bed is at least as great as the height of said mass of compressed seed cotton on said bed measured transversely to the horizontal surface covered by the edges of said bed. The pallet sheet is an imperforate sheet with a plurality of like, parallel transversely extending upwardly convex grooves and downwardly convex portions thereon and the bottoms of said upwardly convex portions contact said runners and the top of each of the runners is firmly joined to the bottom of said sheet at portions of such sheet that are spaced apart from each other by greater distances than the points of contact of said sheet and said runners and wherein the height of said sheet varies in periodic and uniform continuous manner from lowest points to highest points, and intermediate portions of the sheet extend vertically therebetween and are continuous therewith and provide support for said horizontally extending portions and said points of firm connection of the side walls on each runner to the bottom surface of said sheet are abreast of each other and points of attachment of all the runners to the bottom surface of sheet are also abreast of each other. The pallet length is less than the length of the feeder assembly chamber 39.

In operation, a tractor as 424 drawing a trailer as 570 carries a loaded module of cotton 590 on top of a pallet as 450 and passes to one side of the chamber 39 with the pivotal door assembly 34 then in the raised position, as shown in part C of FIG. 25. The operator of the tractor 424 stops when the rear end of the trailer 570 is adjacent but only slightly removed from the forward end of the door assembly 34 in its lowered position. The door assembly 34 is then lowered to its lowered position, as shown in FIGS. 21 and 22.

The positioning cylinders 278 and 279 provide for moving the loading frame 240 laterally and centrally to locate such frame in line with a tractor as 424 and trailer as 570. This ability of the loading assembly 240 to move relative to the frame 150 permits a rapid and convenient loading of the module 597 and pallet 450, carried on the trailer 570 to be conveniently and readily aligned so as to be rapidly and, without skewing, carried on the movable load frame 240 for subsequent movement into the feeder assembly chamber 39.

The movable door frame assembly 240 may be moved outwards of the longitudinal lefthand side member 153 of the feeder assembly frame 150 by extension of the cylinders 278 and 279 that serve to move the movable frame assembly 240 laterally. This movement provides for alignment of the central slot 249 of the frame assembly 240 with a bracket 630 attached to the pallet 450 and also provides for locations of the runners of the pallets as 450 in line with the rows of rollers 280, 281, 282 and 283 of the assembly 240.

A chain drive 292 actuated by a winch 293 on the frame 240 draws the module 597 of cotton into position from the trailer 570 as shown in FIG. 21, to a position abreast of the chamber 39, as shown in FIG. 22.

In particular examples of this operation, the loaded module 597, which has an overall size of $7\frac{1}{2}$ feet wide, by $7\frac{1}{2}$ feet high, by 24 feet long and has an overall density of 12 to 14 pounds per cubic foot and weighs about 15,000 pounds, is thereby loaded on the frame 240. On contraction of pistons 209 and 210, the loaded pallet is held on frame 240 by the clamp bar 190, and is moved inwards on contraction of the auxiliary pistons 278 and 279. The apron 250 is then located below the top of frame 240 (supporting the pallet 450 and the mass of cotton 597 thereon). The frame 240 is then moved centrally toward the chamber 39 to a position as shown in part A of FIG. 25 so that its central longitudinal edge member 246 is substantially adjacent to as well as parallel to the feeder assembly frame member 158. The next step in the operation is that the pivotal frame assembly pistons 101, 102, 103 expand and pivot the pivotal frame members 233, 235, 237 and the remainder of assembly 34 carried thereon to a vertical position, (25C as shown in FIG. 25). Prior to reaching such vertical position, while the module of cotton is at a oblique angle relative to the horizontal, the module breaks and falls into the chamber 39. The further movement of the module from position 25B to 25C results in a more complete breaking up of the theretofore dense and formed module. Accordingly, the operation of the pivotal door 34 provides that a module 590 carried by the frame 240 is pivoted and tipped about its right lower corner (right side as shown in FIG. 25) and also collapsed (as shown in FIG. 25C) or broken while being transferred into the chamber 39. The apron 250 is then retained in position by a separate locking mechanism therefor, the hydraulic piston 127 as shown in FIG. 25.

Once the mass of cotton bolls and trash theretofore in the cotton module has been located on top of the conveyor belt 147 as a cotton mass 139, the top of the conveyor belt is driven by its motor and moves that mass toward the disrupter assembly 41.

The belt 147 has, for cotton bolls, a very low coefficient of friction or, for practical purposes, an extremely smooth surface as measured along its length, as shown by the very light force developed by such a belt against movement of a mass of cotton in the mass 139 along the length of such belt. The belt 147 is made by Cambridge Wire Cloth Company of Cambridge, Maryland 21613, and described in their Brochure No. 148 of 1973 as a Gratex balanced belting. It is formed of flattened helically arrayed round steel wire $\frac{1}{8}$ inch in diameter arrayed in spiral loops 284-7 with a 1 inch interior major diameter and a $\frac{1}{4}$ inch minor diameter. The spiral wire is wound around transverse straight wires 294-298, each $\frac{3}{8}$ inch center to center, and arrayed transverse to the length of the belt. Measured along the length of such transverse wire, there are 16 loops per 5½ linear inches. The spacing or pitch between wires in such spiral array is ¼ inch between adjacent wire edges and adjacent helixes are wound around the same transverse wire in opposite directions.

The chain conveyor belt 147 is supported on flat nylon sheets 141-2 which maintain the bottom of the chain 147 in a flat surface and avoid any dipping as might cause compression of the cotton mass supported thereon.

The moving belt 147 creates a definite but relatively feeble force on the rear end of the bottom of the mass of cotton which force is developed and exerted by the adhesion of the chain belt against the mass of cotton thereabove.

The mass of cotton initially deposited by door 34 on conveyor belt 147 is a loose mass and a one inch diameter broom handle may be pushed by hand one foot into the rear portion of such mass 139 on its initial deposition on the belt 147. The belt 147, driven by its motor under the control of an operator of the machine 30, moves the mass 139 towards the operating assembly 60 whereat a substantial rearward force is developed against forward motion of the cotton mass 139 and the bulk density of the mass 139 is increased. With increased proximity to the disrupter assembly 41, the cotton mass 139 becomes increasingly compressed to a greater bulk density (as 15 pounds per cubic foot).

Because of the low frictional force between the belt and the cottom mass, the length of the zone extending backward from the reel unit 60 to the wall 33 through which such increased density occurs—such increased density is 14 to 15 pounds per cubic foot—increases as the rate of feed to the reel assembly 60 increases from 0 to 4 feet per minute along the belt 147. The area of contact of the compressed mass of increased bulk density with the surface of the belt increases correspondingly to the speed of the belt. The compressed and elastic mass thereby developed provides a relatively even amount of pressure applied against the mass of cottom in the zone 129 immediately adjacent the zone occupied by the teeth of the disrupter reels of assembly 60 whereby a substantially even feed is provided into the disrupter or dispersing assembly. As there is a relatively even beating action by the disrupter assembly on the mass of cotton fed to the reels 61–66, the product from the disrupter assembly has an extremely uniform and self-regulating bulk density.

The apparatus and process of apparatus 30 thus provides for maintaining pressure in the mass 139 by the drive belt as an elongated elastic mass whereby the disrupter mechanism operates at a stable pressure of feed and effects a uniform separation of bolls and various trash. Notwithstanding the apparent delicacy and softness of cotton fiber, the high tensile strength thereof (60 to 120,000 pounds to the square inch compared with 50 to 80,000 pounds to the square inch for steel wire) permits that the high intensity of beating action applied thereto according to this process and apparatus is particularly effective in separating the only lightly adherent trash, twigs and leaves from the cotton as well as disrupting the shell of the cotton bolls and making ginning of the cotton subsequently more efficient.

All of the reels 61–66 of the reel unit 60 are rotated counterclockwise, as seen from the left side (side 163 shown in FIG. 22) by operative connection to the motor 40 under control of the operator at control station 110 of the apparatus 30. The axes of all of the parallel shafts 61.5, 62.5, 64.5, 65.5, and 66.5 of the units 61–66 lie in a flat plane tilted toward the rear wall and at 75° to the horizontal—while the top surface of belt 147 is horizontal.

To provide adequate orifice space for passage of the thus threshold cotton, the open space between vertically adjacent reel units of the entire assembly 60 is approximately one-third of the total cross-section area measured in a vertical plane parallel to shafts as 62.5 of that assembly. In the particular example given, the teeth as 175.5 are each made of round steel rod, ¼ inch in diameter, and the terminal portion thereof extends 3 inches peripheral to the top edge of the rod as 201 on which each such tooth is supported. For each unit as 62.2, the bottom edge of plates 46 and 47-12 inches in diameter—of unit 62.2 are at the same vertical height as the top of the upwardly directed teeth of the unit 61.2 therebelow as shown in FIGS. 30 and 31 and the top edge of plates 46 and 47 of unit 62.2 are at the same vertical level as the bottom edge of the teeth in the unit 62.3 thereabove, generally as shown in FIGS. 26 and 30. FIG. 24 is pictorial, hence does not illustrate such relationship although FIGS. 30 and 31 illustrate to scale some three dimensional aspects of the assembly 60.

In operation, the reel teeth of the disrupter assembly are moved by the motor 40 at a sufficiently rapid rate of speed, about 600 to 700 r.p.m., to provide at the end of each of the teeth a peripheral speed of 3,000 feet per minute or 50 to 60 feet per second. Such speed is sufficiently rapid to beat and tear rather than only pull the material contacted by such teeth. The beating and tearing loosens the cotton in the bolls from the adjacent stalks, leaves and entrapped trash in the mass 597 and 139. This disrupted material 140 thus drawn from the mass 139 is thrown to the front of the line of disrupter reels 61–66 into the space 50 (see FIGS. 20 and 23) above the conveyor belt 52 of the separator assembly 51.

The condition of the material 140 discharged by reel assembly 60 as well as the operation of portions of the assembly 60 may be observed through the windows 166–170 in walls 163 and 164 and the operation of fans 53 and 83 observed through window 171. A conveyor belt 52 supported on frame 152 for movement transverse to the belt 147 is driven by a belt motor 49 supported on frame 152 therefor and operatively connected to the belt 52 for driving thereof under control at control station 110 dependent upon the observation of operation of the product in trash assembly 59 and product observed in window 171. Assembly 110 is connected to a source of power to operate all motors and cylinders of apparatus 30. A fan 53 on hood 160 is connected to upper end of duct 54 and powered by a motor 48 therefor operatively connected to a source of power through control assembly 110. The size of orifice 55 over belt 52 is adjustable by the vertical movement of throat plate 45.

At the discharge of the belt 52 (shown in FIG. 34) a separating chamber is formed whereat the fan 53 creates a draft of air through a duct inlet 55 and drives the air and the cotton carried therewith through duct 57 to the outlet 56 thereof into a collector 80 for the cotton while the trash, i.e. the twigs and shells of the cotton bolls are collected in the trash collector assembly 59.

Trash collector assembly 59 comprises a trash collector chute 257 a trash conveyor 258 and a trash collection chamber 259 in operative connection, as shown in FIG. 21.

Because the disrupter reel units as 61–66 separate the seed cotton bolls from the trash in such a manner as to fluff up the cotton bolls during such process of treatment (by assembly 60), the air stream provided at the duct inlet 55 lifts up the seed cotton bolls from the belt 52 and leaves the heavier materials theretofore intermixed therewith in mass 597 (sticks, rocks and heavier bolls) to be conveyed to and discharged from the end of the belt 52 to the collector assembly 59. Accordingly, apparatus 30 provides a separation of the trash and boll components from the mass 597 prior to the disrupted or dissociated mass 140 entering a gin. This preparation and separation saves ginning time, saves wear on machinery and pollution by avoiding polluting air with the separation trash and as well as reducing the density of the mass of seed cotton economically transported on pallet 450 (and thereby avoid clogging or interfering with best performance of a gin).

While the discharge of duct 57 is shown in FIG. 21 as passing to a collector chamber 80, such collector chamber may be part of a gin building 85 and one stage in a conventional gin treatment by a train of apparatus comprising a boll trap 81, an unloading separator 82, a fan 83, and a cyclone 84; also, the discharge of duct 57 may pass directly to such train of apparatus as to member 81 thereof in the gin building 85 rather than through the intermediate storage 80.

A fan transition piece 54.7 is used as the inlet from the upper end 54.6 of the duct 54 to the inlet of fan 53 when the duct 54 feeds to fan 53 on apparatus 30. However, other transition pieces, as double fan transition pieces 87 and 88 are connected to top of duct 54 and used when the upper end 54.6 of the duct 54 feeds directly to a plurality of ducts as 88 and 89 (as shown in FIGS. 34 and 35) as are conventional in feeding to a pneumatic system in a gin (as in building 85) powered by its own fan as 83. The separation of field trash from seed cotton bolls at the end of belt 52 of apparatus 30 is still effected as above described (for operation when fan 53 is connected to duct 54) when the separating duct 54 is connected to the gin fan, as 83 as shown in FIG. 35, although the source of pneumatic power is then the fan 83 in the gin building 85. An operator 100 is illustrated in FIG. 32 to show the approximate size of the equipment discussed.

By this process and apparatus, the irregularities in composition and density resulting from the gathering of natural product from different areas of ground from which usual cotton crop is harvested, provides that the bottom zones of a module as 597 (which would be the material first formed into the module mass 597 and generally the materials first gathered as a particular harvesting operation) would be somewhat different in composition from the upper zones thereof which are later harvested or picked. By the process of this operation, the turning of the module mass provided by the motion of the door 34 shown in FIG. 25 provides that the material initially on the module bottom is then located near the apron wall adjacent the door 34 and the material initially at the module top is located adjacent the side wall 32, as shown in FIG. 25 (part C) when located in chamber 39. This turning operation thus provides a relative uniformity from what had been a dissimilar feed and a more uniform operation and better grade results in the gin to which the collected material from apparatus 30 is fed.

The length relationship above described in reference to teeth of embodiments of FIGS. 30 and 31 is an alternative to the relationship of Table I and FIG. 24. In the embodiment of Table I, the upper ends of teeth as 175.5A of a lower unit as 61.2 extend to a vertical height that is $\frac{7}{8}$" short of the vertical level of bottom edge of reel plates 46 and 47 of unit 62.2 thereabove, although, as in embodiment of FIG. 30, the upper end of each of the teeth, as 175.5A, of the lower unit (62.1) always extend to a greater height than the lower end of each of the teeth as 175.5 of the unit (as 62.2) thereabove. The overlap of the vertical extensions of the teeth of the upper and lower units of insert Table I is $1\frac{1}{8}$" total rather than the $2\frac{7}{8}$" for such overlap in the embodiment of FIGS. 30 and 31. The speed of the belt 147 may be controlled by an operator at control station 110 dependent upon his observation of the condition of the mass of cotton in window 170 of the sounds of the reel unit 60 against the mass 139 indicating the teeth thereof contact each increment of such mass with adequate impact.

I claim:

1. Process of loading and transporting seed cotton comprising the steps of
    (a) vertically compressing a longitudinally continuous mass of seed cotton free of lateral compression of a horizontally extending support,
    (b) applying a water-impermeable cover to the top of said compressed mass and connecting said cover to said support peripherally to said mass, then
    (c) serially moving successive increments of said covered mass upwards along an inclined surface while concurrently moving other portions of said longitudinally continuous mass horizontally towards said inclined surface and forming successive temporarily downwardly convex portions at the bottom of the longitudinally continuous mass and successive temporarily upwardly concave portions at the top of said longitudinally continuous mass while limiting the compression of the material in said mass at the upper portion of said mass to prevent lateral extrusions from the side thereof by the step of limiting the radius of curvature of the downwardly convex portion to a predetermined minimum size of radius of curvature.

2. Process as in claim 1 wherein the said seed cotton mass is compressed to a uniform density between 12 and 14 pounds per cubic foot.

3. Process as in claim 2 wherein the longitudinally continuous mass of compressed cotton weighs about 15,000 pounds.

* * * * *